(12) United States Patent
Lavoie et al.

(10) Patent No.: US 9,781,438 B2
(45) Date of Patent: Oct. 3, 2017

(54) STANDARDIZED HOT-PLUGGABLE TRANSCEIVING UNIT WITH SIGNAL ENCODING OR DECODING CAPABILITIES

(71) Applicant: Embrionix Design inc., Laval (CA)

(72) Inventors: Renaud Lavoie, Laval (CA); Eric Dudemaine, Crabtree (CA); Normand Leclerc, St-Jean-sur-le-Richelieu (CA)

(73) Assignee: EMBRIONIX DESIGN INC., Laval (CA)

( * ) Notice: Subject to any disclaimer, the term of this patent is extended or adjusted under 35 U.S.C. 154(b) by 205 days.

(21) Appl. No.: 14/847,273

(22) Filed: Sep. 8, 2015

(65) Prior Publication Data

US 2016/0073121 A1 Mar. 10, 2016

Related U.S. Application Data

(60) Provisional application No. 62/048,088, filed on Sep. 9, 2014.

(51) Int. Cl.
| | |
|---|---|
| *G06F 9/44* | (2006.01) |
| *H04N 19/40* | (2014.01) |
| *H04N 7/01* | (2006.01) |
| *H04L 12/66* | (2006.01) |
| *H04L 12/64* | (2006.01) |
| *H04N 5/44* | (2011.01) |

(52) U.S. Cl.
CPC .......... *H04N 19/40* (2014.11); *H04L 12/6418* (2013.01); *H04L 12/66* (2013.01); *H04N 5/4401* (2013.01); *H04N 7/0102* (2013.01)

(58) Field of Classification Search
CPC ...... H04N 19/00; H04N 19/40; H04N 7/0102; G06F 9/4413; G06F 13/4081
USPC .................................................... 710/68, 302
See application file for complete search history.

(56) References Cited

U.S. PATENT DOCUMENTS

| | | | |
|---|---|---|---|
| 2007/0180145 A1* | 8/2007 | Scheibe | G06F 21/85 709/246 |
| 2010/0014566 A1* | 1/2010 | Mezer | H04B 10/40 375/220 |
| 2010/0095110 A1* | 4/2010 | Noble | H04L 9/0891 713/153 |
| 2011/0033049 A1* | 2/2011 | Aronson | H04B 10/40 380/256 |

(Continued)

OTHER PUBLICATIONS

Renaud Lavoie, The evolution of the pluggable module, http://www.tvtechnology.com/multiformat/0112/the-evolution-of-the-pluggable-module/267340 , Aug. 1, 2012.

*Primary Examiner* — Glenn A Auve
(74) *Attorney, Agent, or Firm* — IP Delta Plus Inc.

(57) ABSTRACT

The present disclosure relates to a standardized hot-pluggable transceiving unit with signal encoding or decoding capabilities. The transceiving unit comprises a housing with specific standardized dimensions and adapted to being inserted into a chassis of a hosting unit. The transceiving unit comprises a first connector for receiving a first signal comprising data in a first form. The transceiving unit comprises a coding module in the housing, for encoding or decoding the data of the first signal into a second signal having a second form. The transceiving unit comprises a second connector for outputting the second signal. The transceiving unit may comprise at least one additional coding module in the housing, for encoding or decoding data.

20 Claims, 24 Drawing Sheets

(56) References Cited

U.S. PATENT DOCUMENTS

| | | | | |
|---|---|---|---|---|
| 2011/0066909 A1* | 3/2011 | Skirmont | ............... | H04B 10/40 714/746 |
| 2011/0135312 A1* | 6/2011 | El-Ahmadi | ........... | H04L 1/0057 398/135 |
| 2012/0102239 A1* | 4/2012 | Huang | .............. | H04L 12/40169 710/14 |
| 2012/0189300 A1* | 7/2012 | Lindsay | ............... | H04B 17/345 398/26 |
| 2012/0249871 A1* | 10/2012 | Nguyen | ................ | H04B 10/40 348/441 |
| 2016/0021402 A1* | 1/2016 | LaBosco | ............ | H04N 21/4398 725/31 |

* cited by examiner

STANDARDIZED HOT-PLUGGABLE TRANSCEIVING UNIT WITH SIGNAL ENCODING OR DECODING CAPABILITIES

TECHNICAL FIELD

The present disclosure relates to the field of standardized hot-pluggable transceiving units. More specifically, the present disclosure relates to a standardized hot-pluggable transceiving unit with signal encoding or decoding capabilities.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, etc. However, such SFP units lack the capability to code and/or decode a signal having a first form into another signal having a second form. More generally, standardized hot-pluggable transceiving units lack this capability to code and/or decode a signal.

Therefore, there is a need for a new standardized hot-pluggable transceiving unit with signal encoding or decoding capabilities.

SUMMARY

According to a first aspect, the present disclosure provides a standardized hot-pluggable transceiving unit comprising a housing, a first connector, a coding module and a second connector. The housing has specific standardized dimensions and is adapted to being inserted into a chassis of a hosting unit. The first connector receives a first signal comprising data in a first form. The coding module is in the housing, and encodes or decodes the data of the first signal into a second signal having a second form. The second connector outputs the second signal.

According to a second aspect, the present disclosure provides a standardized hot-pluggable transceiving unit comprising a housing, a connector, and a coding module. The housing has specific standardized dimensions and is adapted to being inserted into a chassis of a hosting unit. The connector receives a first signal comprising data in a first form and outputs a second signal in a second form. The coding module is in the housing, and encodes or decodes the data of the first signal into the form of the second signal.

According to a third aspect, the present disclosure provides a standardized hot-pluggable transceiving unit comprising a housing and at least two coding modules. The housing has specific standardized dimensions and is adapted to being inserted into a chassis of a hosting unit. The at least two coding modules are in the housing, and respectively encode or decode a first signal received by the transceiving unit into a second signal having a second form and being outputted by the transceiving unit.

BRIEF DESCRIPTION OF THE DRAWINGS

Embodiments of the disclosure will be described by way of example only with reference to the accompanying drawings, in which.

DETAILED DESCRIPTION

Figure 1:
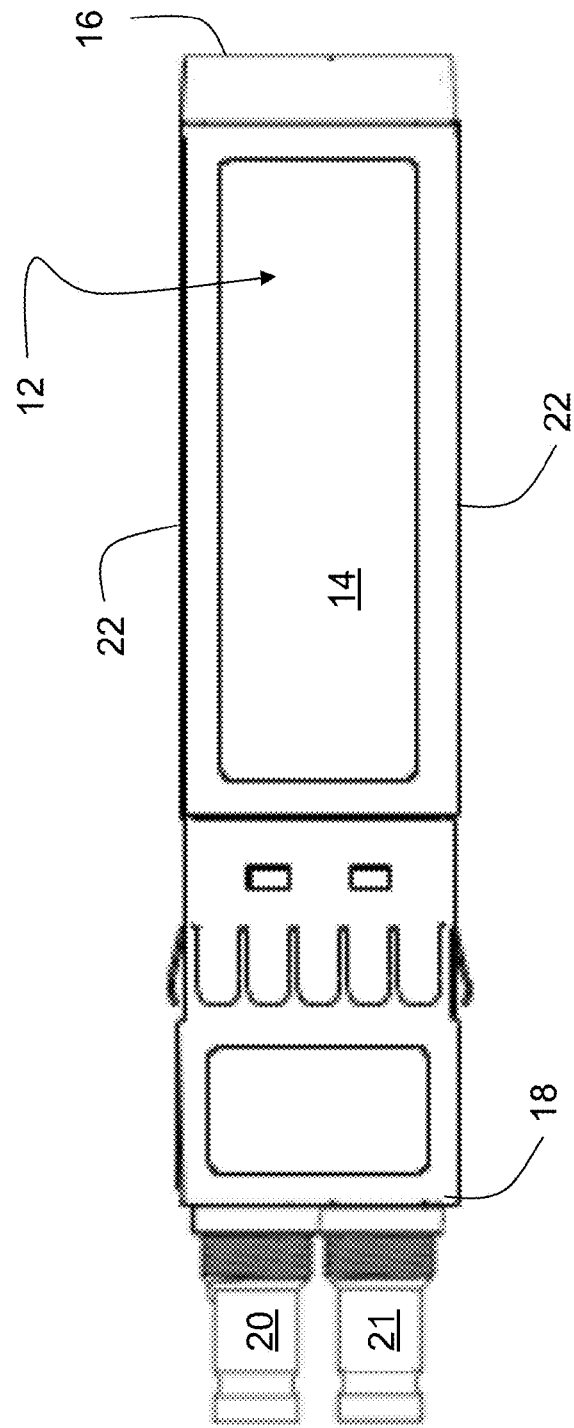
FIG. 1 is a top view of an SFP unit.
Figure 2:
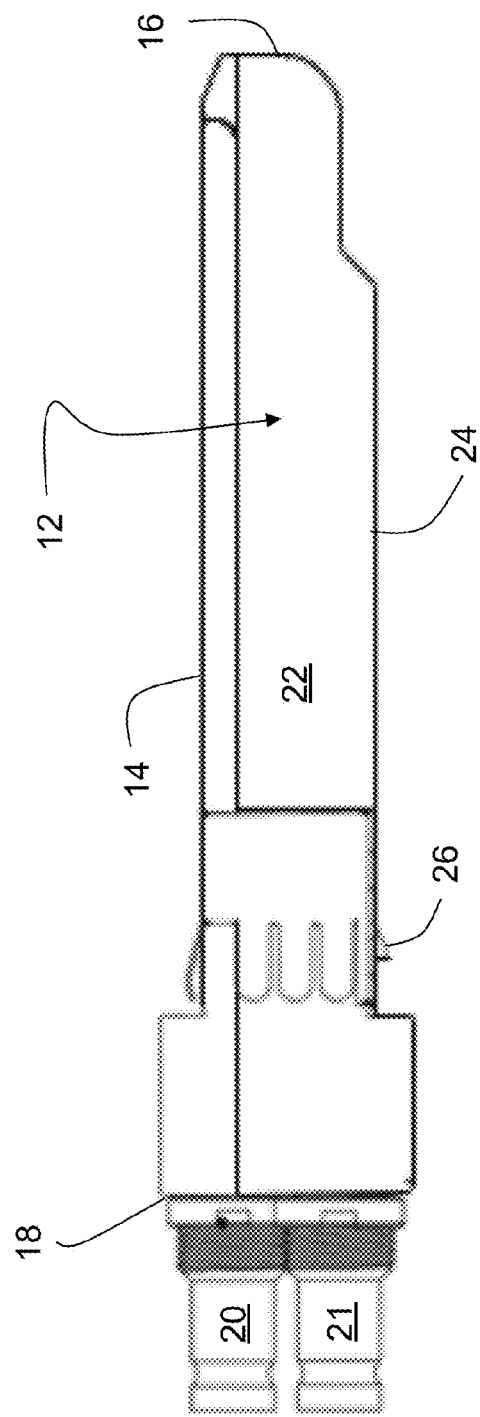
FIG. 2 is a side elevation view of the SFP unit of FIG. 1.
Figure 4:
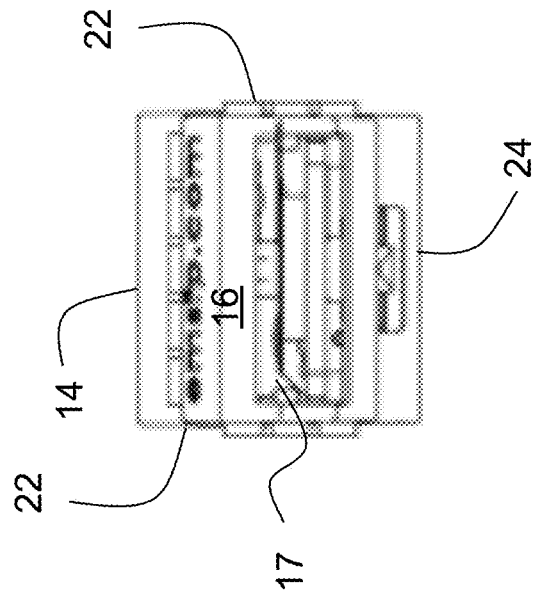
FIG. 4 is back elevation view of the SFP unit of FIG. 1.
Figure 3:
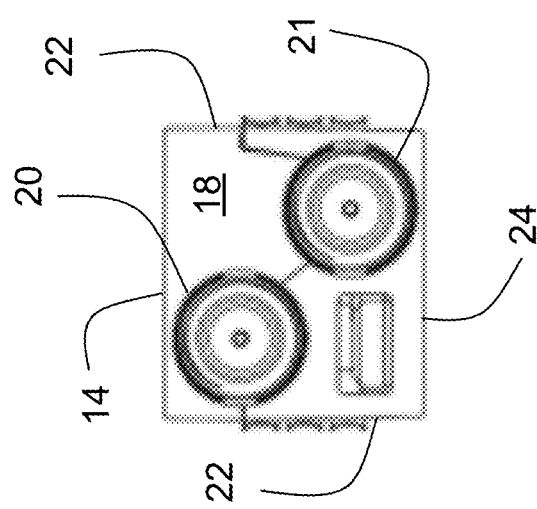
FIG. 3 is a front elevation view of the SFP unit of FIG. 1.
Figure 5:
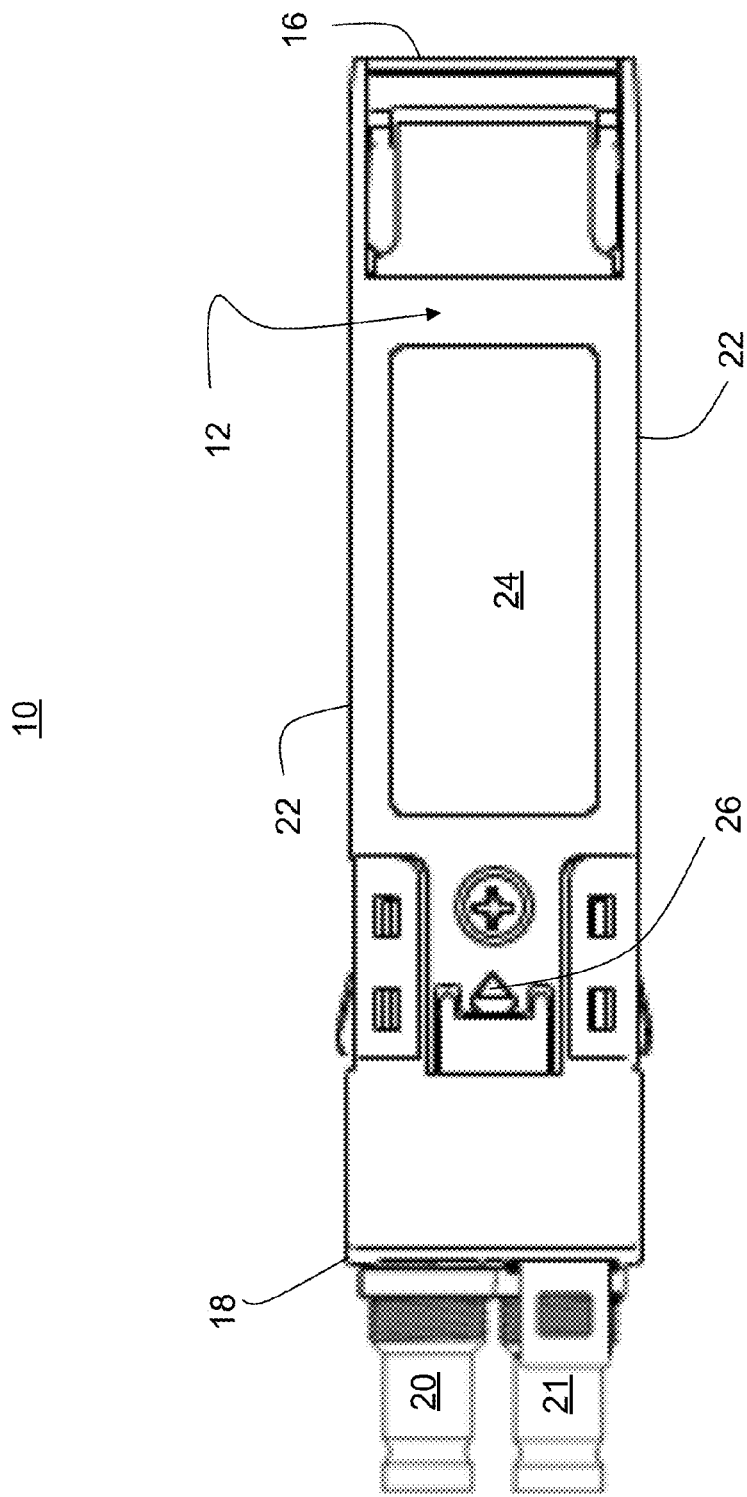
FIG. 5 is a bottom view of the SFP unit of FIG. 1.
Figure 6:
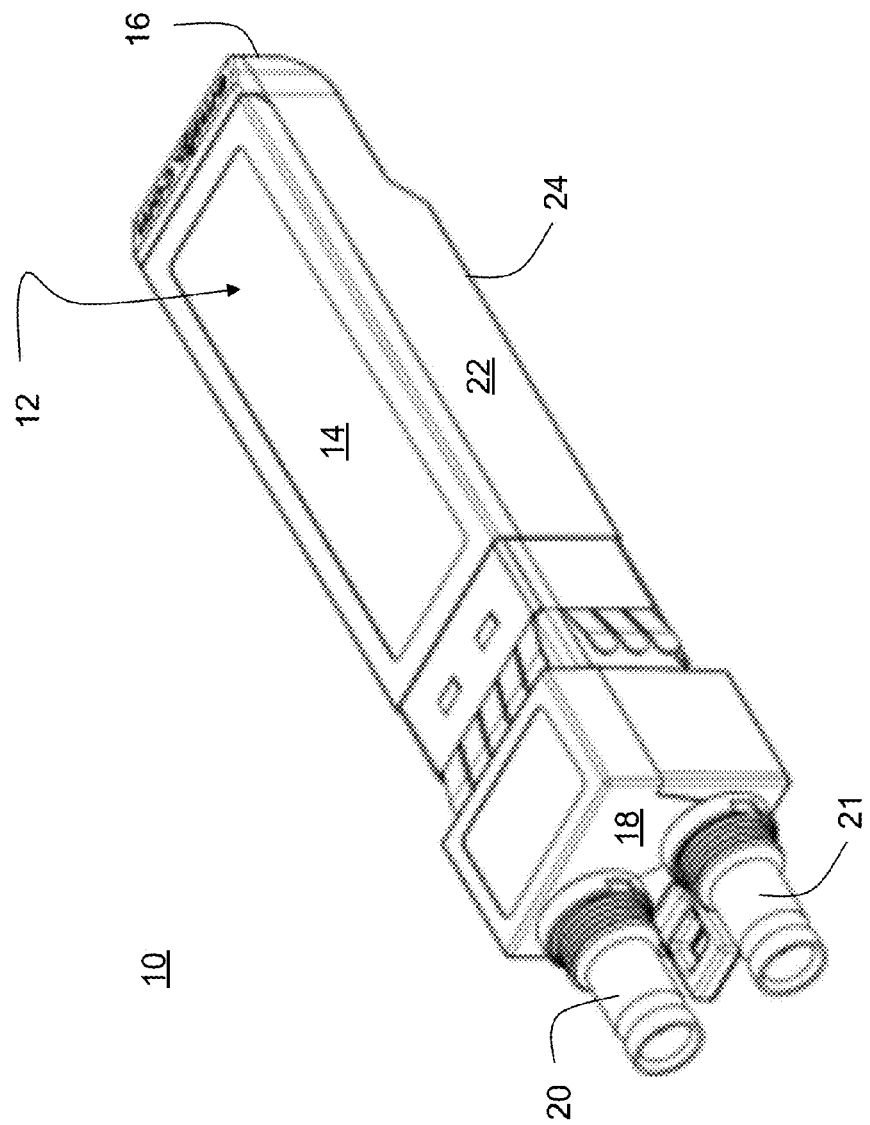
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving unit disclosed herein provides the capability to code and/or decode one or multiple signal(s) having a first form into another one or multiple signal(s) having a second form. For this purpose, the standardized hot-pluggable transceiving unit includes one or multiple coding module(s) inside its housing.

The following terminology is used throughout the present disclosure:

SFP: Small Form-factor Pluggable, this term refers to units that are insertable into a chassis of a hosting unit; in the present disclosure, an SFP unit complies with an industry standard specification.

ADC: Analog to Digital Converter or Conversion of an electrical or optical signal.

DAC: Digital to Analog Converter or Conversion of an electrical or optical signal.

Serializer: Module converting data from a parallel format to a serial format.

Deserializer: Module converting data from a serial format to a parallel format.

Connector: A device component for physically joining circuits carrying electrical, optical, radio-frequency, or like signals.

Video signal: Analog or digital signal usable for display purposes, either directly on a monitor, or through multicast or broadcast.

NTSC: National Television System Committee specification for analog television broadcast used in North America and elsewhere.

PAL: Phase Alternating Line specification for analog television broadcast used in Western Europe and elsewhere.

SECAM: Séquentiel couleur à mémoire, French for "Sequential Color with Memory", specification for analog television broadcast used in France, Eastern Europe and elsewhere.

RGB: Red Green Blue color model for video signals, used for example in computer displays; this includes both RGBS, in which horizontal and vertical synchronization are carried on a single (S) wire, and RGBHV, in which horizontal synchronization is carried on a (H) wire and vertical synchronization is carried on a (V) wire.

SDI: Serial Digital Interface, a family of digital video interfaces using one or more coaxial cables with Bayonet Neill-Concelman (BNC) connectors.

SDTV: Standard-definition television uses a resolution that is not considered to be either high-definition television (HDTV) or enhanced-definition television (EDTV). The two common SDTV signal types are 576i, with 576 interlaced lines of resolution, derived from the European-developed PAL and SECAM systems.

EDTV: Enhanced-definition television defines formats (e.g. 480p) that deliver a picture superior to that of SDTV, but not as detailed as HDTV.

HDTV: High-definition television defines formats (e.g. 720p, 1080i, and 1080p) that provide a resolution that is substantially higher than that of SDTV and EDTV.

$YP_BP_R$: Color space encoding in which Y represents a brightness level, $P_B$ carries a difference between blue and the brightness level, and $P_R$ carries a difference between red and the brightness level.

JPEG: An image compression standard defining encoding and decoding schemes applied to digital images and digital video signals such as digital television signals.

JPEG 2000: An image compression standard (also known as J2K) that is a successor of the JPEG compression standard. The JPEG 2000 standard uses wavelet-based image compression and stores metadata as Extensible Markup Language (XML) instead of Exchangeable image file format (Exif) data.

SMPTE: A family of digital video transmission standards published by the Society of Motion Picture and Television Engineers (SMPTE).

H264: A video compression format also known as MPEG4 AVC (Advanced Video Coding).

MPEG2: A standard for generic coding and compression of moving pictures and associated audio information.

MPEG4: A standard for a group of audio and video coding and compression formats.

HEVC: High Efficiency Video Coding, a video compression standard (also known as H265) successor to the H.264/MPEG-4 AVC standard.

Coding module: A hardware component or computer program capable of encoding or decoding a digital data stream or a signal. A coding module may encode a communication protocol for transmission, storage or encryption, or decode it for playback or editing.

Encoding and decoding: Converting (information or instruction) into a particular form.

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP Unit may correspond to SFP, SFP+, XFP, Xenpak, QSFP, QSFP+, CFP, CPAK, or any other known standards related to Small Form-factor Pluggable units.

In the present description, the term "video signal" may designate signals compliant with various standards and specifications, including but not limited to a National Television System Committee (NTSC) signal, a Phase Alternating Line (PAL) signal, a Sequential Color with Memory (SECAM) signal, an analog signal of the Red Green Blue (RGB) format, a standard definition television (SDTV) format, an enhanced definition television (EDTV) format, a high definition television (HDTV) format, a full high definition (full HD) format, an SMPTE format, etc.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 may have functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 may comprise a rear interface 17, for instance an electrical or an optical interface. In an example, the back panel comprises the rear interface 17 (also named a host connector) suitable to connect the SFP unit 10 to a backplane of a chassis (not shown for clarity purposes), as known to those skilled in the art.

The SFP unit 10 further comprises a front panel 18 affixed to the housing 12. The front panel 18 may comprise one or more connectors, for example a connector 20 of a co-axial cable type, adapted to send and/or receive an analog or digital video signal and a connector 21, also of the co-axial cable type, adapted to send and/or receive a serial data signal. The SFP unit 10 may further comprise an engagement mechanism, such as for example a latch 26 as shown in a resting position on the bottom 24 in FIG. 2, for maintaining the SFP unit 10 in place within a chassis.

Examples of connectors in the context of the present disclosure comprise all types of co-axial cable connectors, all types of optic fiber connectors, a Separate Video (S-Video) connector, a Composite Video, Blanking and Sync (CVBS) connector, a Radio Corporation of America (RCA) connector, a BNC connector, a DIN (specified by the Deutsches Institut für Normung) 1.0/2.3 connector, a HD-BNC connector, a Mini-BNC connector, a Video In Video Out (VIVO) connector, a $YP_BP_R$ connector, a mini Video Graphics Array (VGA) connector, a TV Aerial Plug connector, a mini-DIN connector, a Universal Serial Bus (USB) connector, a High-Definition Multimedia Interface (HDMI) connector, and a SDI connector, wherein SDI connectors include variants known as SD-SDI, HD-SDI, ED-SDI, 3G-SDI, 6G-SDI, 12G-SDI and the like. Some of these connector types are suitable for transmission of analog video signals, digital video signals or serial data signals, or a combination thereof, as is well known to those of ordinary skill in the art. Consequently, in an embodiment, the connector 20 and the connector 21 may be of the same type.

Figure 7A:
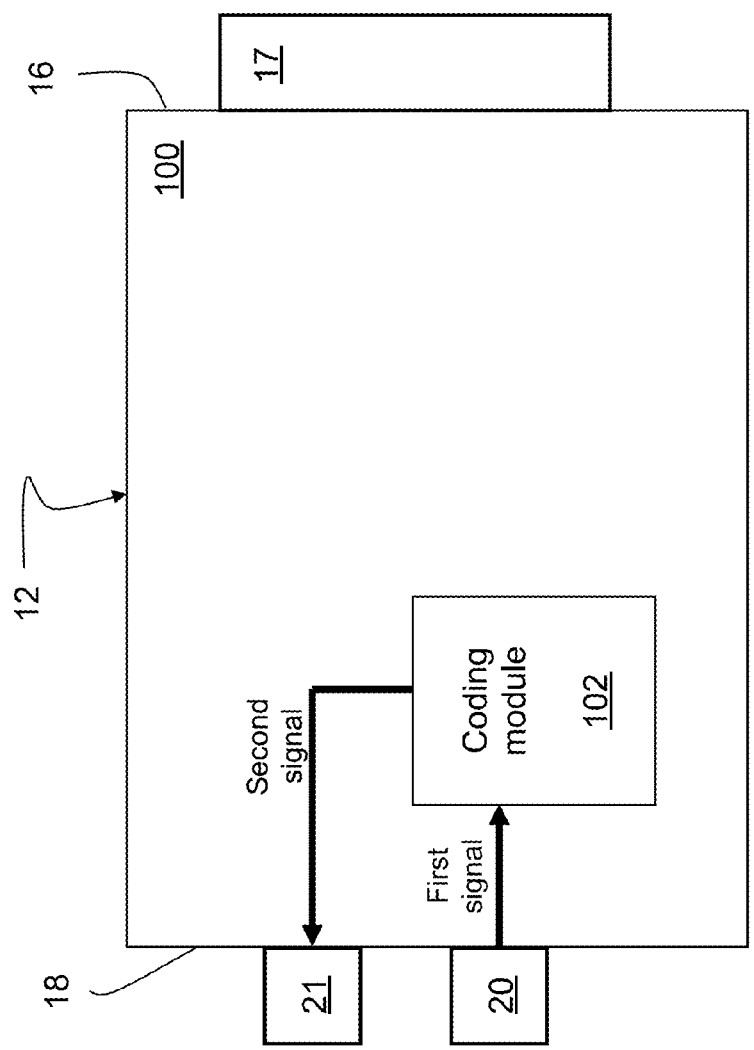
FIG. 7A is a simplified exemplary block diagram of an SFP unit having signal encoding or decoding capabilities, according to an embodiment.
Figure 7B:
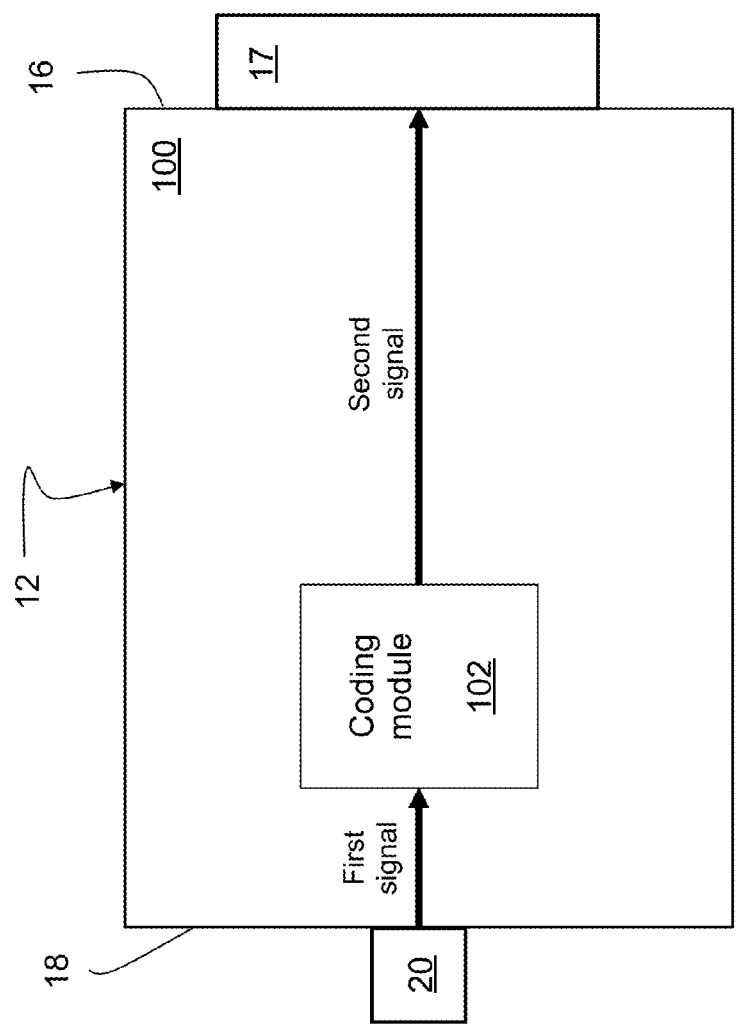
FIG. 7B is a simplified exemplary block diagram of an SFP unit having signal encoding or decoding capabilities, according to another embodiment.
Figure 7C:
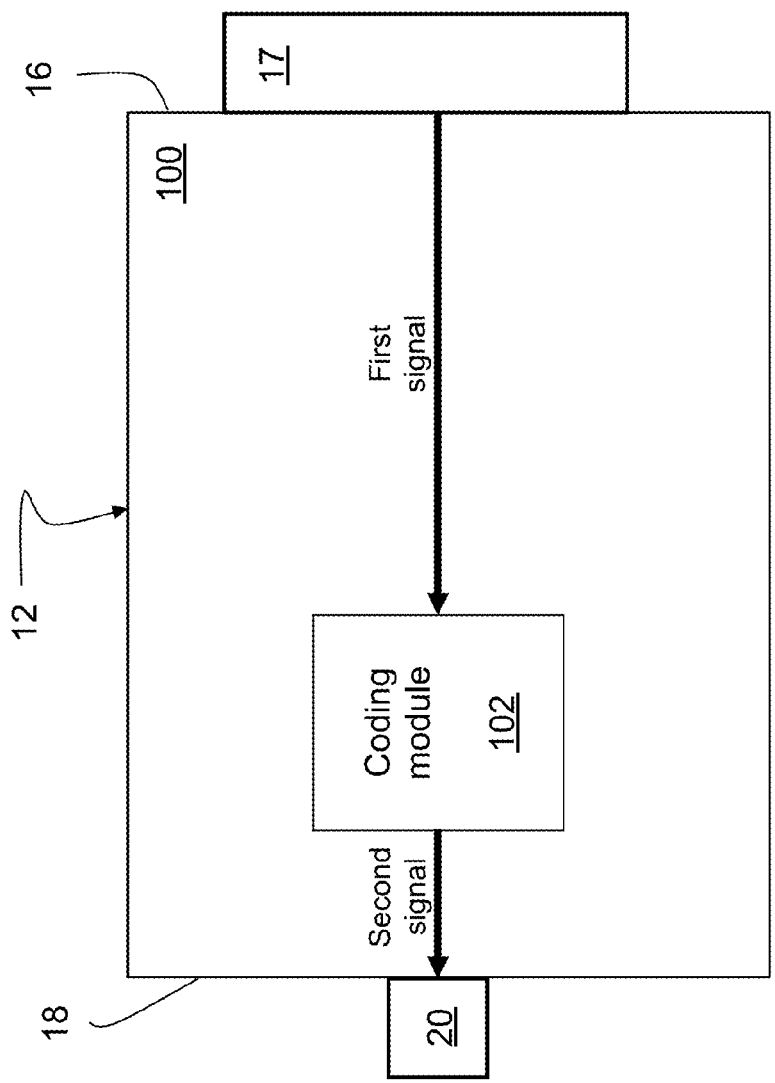
FIG. 7C is a simplified exemplary block diagram of an SFP unit having signal encoding or decoding capabilities, according to another embodiment.

Referring now concurrently to FIGS. 7A, 7B and 7C, an exemplary block diagram of an SFP unit 100 having encoding or decoding capabilities is illustrated. The SFP unit 100 corresponds to the SFP unit 10 represented in FIGS. 1-6, and has been adapted to provide the encoding or decoding capabilities. Additional components of the SFP unit 100, such as a coding module 102, are internal to its housing 12. The housing 12 has specific standardized dimensions and is adapted to being inserted into a chassis of a hosting unit (not represented in the Figures).

The SFP unit 100 comprises a first connector for receiving a first signal comprising data in a first form and a second connector for outputting a second signal comprising data in a second form. The coding module 102 comprised in the housing 12 encodes or decodes the data of the first signal having the first form into the second signal having the second form.

In a first illustrative embodiment represented in FIG. 7A, the first connector 20 for receiving the first signal is on the front panel 18 of the SFP unit 100, and the second connector 21 for outputting the second signal is also on the front panel 18.

In another illustrative embodiment represented in FIG. 7B, the first connector 20 for receiving the first signal is on the front panel 18, and the second connector 17 for outputting the second signal is a rear interface on the back panel 16 of the SFP unit 100.

In still another illustrative embodiment represented in FIG. 7C, the first connector 17 for receiving the first signal is a rear interface on the back panel 16, and the second connector 20 for outputting the second signal is on the front panel 18.

In an exemplary use case, the coding module 102 of a first SFP unit 100 represented in FIG. 7C encodes a signal received from a first hosting unit (not represented in FIG. 7C) via the rear interface 17. The resulting encoded signal is outputted via the front connector 20 to an electrical or optical cable (not represented in FIG. 7C). The cable transmits the encoded signal to a second SFP unit 100 represented in FIG. 7B. The coding module 102 of the second SFP unit 100 represented in FIG. 7B decodes the encoded signal received via the front connector 20. The resulting decoded signal is outputted via the rear interface 17 to a second hosting unit (not represented in FIG. 7B).

The coding module 102 is an electronic device which may comprise hardware components only (e.g. one or several Field-Programmable Gate Array (FPGA), one or several microprocessors, one or several microcontrollers, a combination thereof, etc.) or a combination of hardware and software components (e.g. a memory for storing a computer program and a processor for executing the computer program). One or multiple signal data encoding or encoding performed by the coding module 102 may be performed by hardware means only, by software means only, or by a combination of hardware and software means. Coding modules are well known in the art. They may take various forms, and have multiple encoding or decoding capabilities defined by multiple encoding and decoding standards. The coding module 102 may also have data transcoding capabilities. The coding module 102 may further be capable of performing data encryption or decryption. The present disclosure is directed to any coding module 102 having a form factor allowing insertion in the housing 12 of the SFP unit 100. The encoding capabilities of a coding module mainly comprise the functionality of compressing the data of a signal, while the decoding capabilities mainly comprise the functionality of decompressing the data of a signal. The transcoding capabilities of a coding module consist in direct analog-to-analog or digital-to-digital conversion of one encoding format to another. Transcoding is generally implemented as a two-step process, in which the original data is decoded to an intermediate uncompressed format, which is then encoded into the target format.

In a particular aspect, encoding the first signal by the coding module 102 comprises compressing the data of the first signal. For example, the coding module 102 of the SFP unit 100 represented in FIG. 7C compresses a signal received from a hosting unit (not represented in FIG. 7C) via the rear interface 17. The compressed signal is outputted to a cable or to a fiber (not represented in FIG. 7C) via the front connector 20. The compression of the signal decreases the bandwidth required for transmitting the signal over the cable (or the fiber). The cable (or the fiber) may be shared with other equipments than the SFP unit 100, and thus compressing the signal via the coding module 102 is a more effective way of using the bandwidth provided by the cable (or the fiber).

In another particular aspect, decoding the first signal by the coding module 102 comprises decompressing the data of the first signal. For example, the coding module 102 of the SFP unit 100 represented in FIG. 7B decompresses a signal received from a cable or a fiber (not represented in FIG. 7B) via the front connector 20. The decompressed signal is transmitted to a hosting unit (not represented in FIG. 7B) via the rear interface 17.

In still another particular aspect, the first and second signals are video signals. The coding module 102 encodes or decodes the first video signal comprising data in a first form into the second video signal having a second form. In a particular embodiment, the second form is compatible with one of the following video standards: the JPEG standard, the JPEG 2000 standard, the H264 standard, the HEVC standard, the MPEG2 standard, the MPEG4 standard, etc. The first video signal (e.g. an HDTV signal) received by the SFP unit 100 is encoded by the coding module 102 into the second video signal having the second form (e.g. a JPEG 2000 signal). In an alternative embodiment, the first form is compatible with one of the following video standards: the JPEG standard, the JPEG 2000 standard, the H264 standard, the HEVC standard, the MPEG2 standard, the MPEG4 standard, etc. The first video signal having the first form (e.g. a JPEG 2000 signal) received by the SFP unit 100 is decoded by the coding module 102 into the second video signal (e.g. an HDTV signal).

Figure 7D:
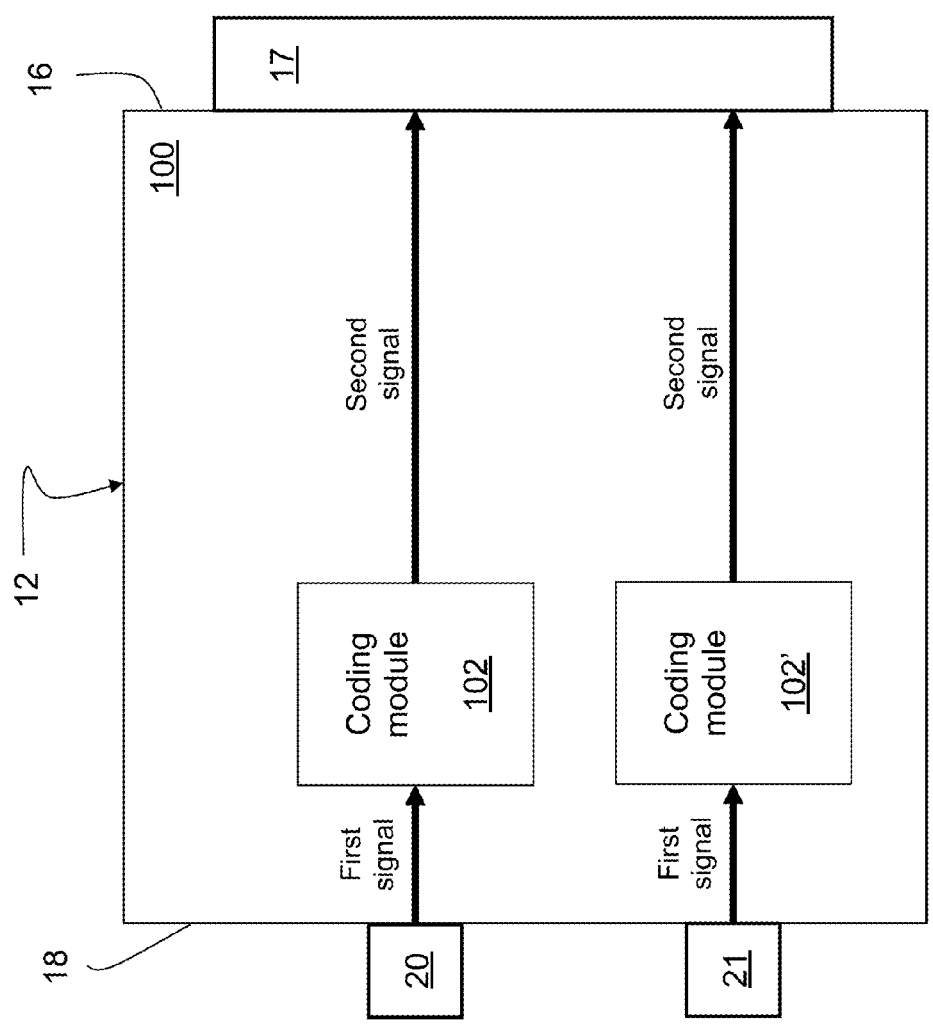
FIG. 7D is a simplified exemplary block diagram of an SFP unit having two coding modules, according to another embodiment.
Figure 7E:
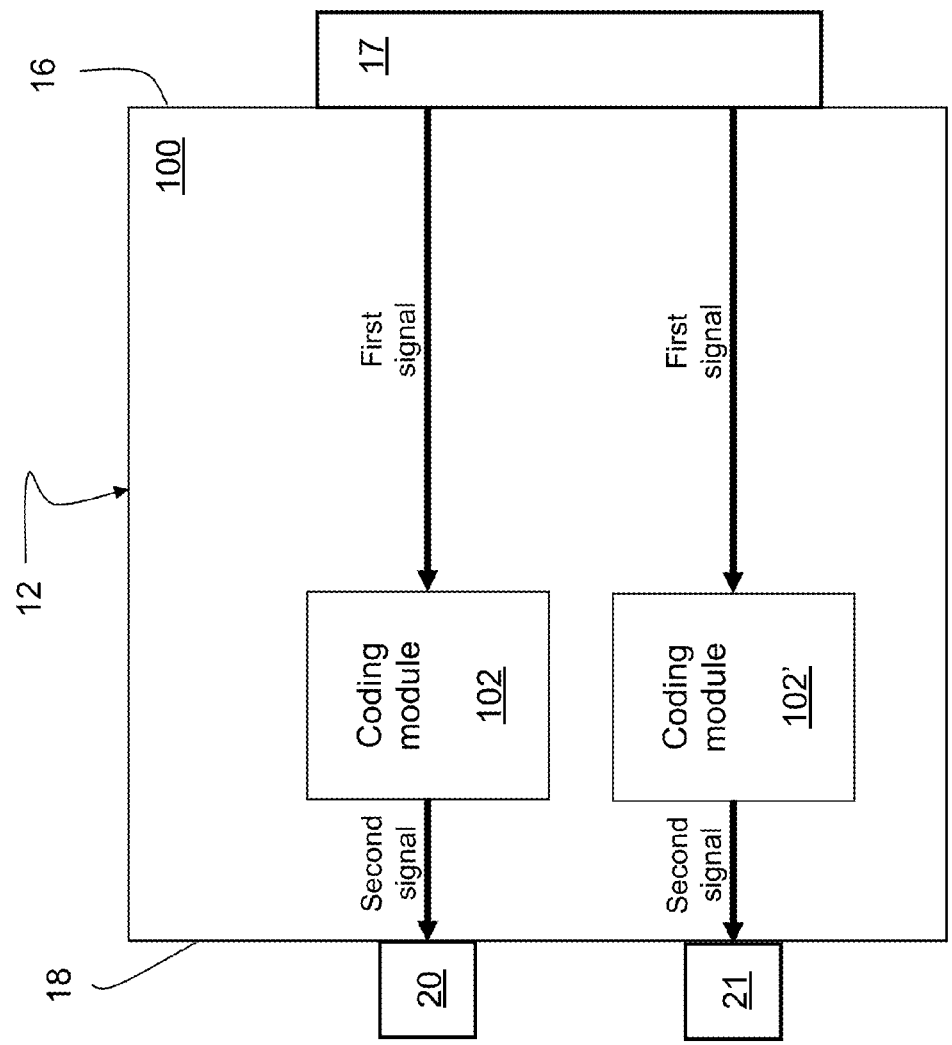
FIG. 7E is a simplified exemplary block diagram of an SFP unit having two coding modules, according to another embodiment.

In yet another particular aspect, and referring now to FIGS. 7D and 7E, the SFP unit 100 may comprise two or more coding modules in the housing 12.

The SFP unit 100 represented in FIG. 7D comprises two coding modules 102 and 102'. The first connector 20 on the front panel 18 receives a first signal comprising data in a first form. The coding module 102 encodes or decodes the data of the first signal into a second signal having a second form. The second signal is outputted by the rear interface 17 on the back panel 16. Similarly, the second connector 21 on the front panel 18 receives a first signal comprising data in a first form. The coding module 102' encodes or decodes the data of the first signal into a second signal having a second form. The second signal is outputted by the rear interface 17 on the back panel 16.

The SFP unit 100 represented in FIG. 7E comprises two coding modules 102 and 102'. The rear interface 17 on the back panel 16 receives a first signal comprising data in a first form. The coding module 102 encodes or decodes the data of the first signal into a second signal having a second form. The second signal is outputted by the first connector 20 on the front panel 18. Similarly, the rear interface 17 on the back panel 16 receives another first signal comprising data in a first form. The coding module 102' encodes or decodes the data of the first signal into a second signal having a second form. The second signal is outputted by the second connector 21 on the front panel 18.

Figure 8A:
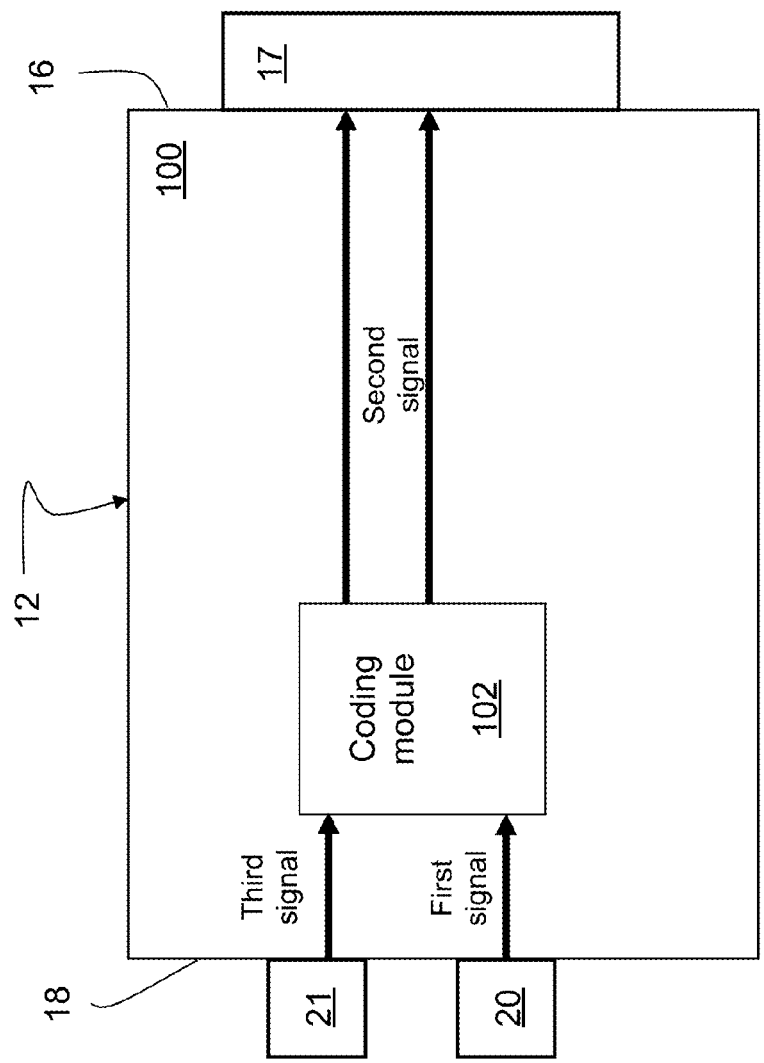
FIG. 8A is a simplified exemplary block diagram of an SFP unit having multiple signals encoding or decoding capabilities, according to an embodiment.

In another particular aspect, and referring now to FIG. 8A, an exemplary block diagram of an SFP unit 100 comprising a coding module 102 for encoding or decoding a plurality of signals received via a plurality of connectors is illustrated. The connector 20 on the front panel 18 receives a first signal while the connector 21 on the front panel 18 receives a third signal. The first signal and the third signal comprise data in a first form. The coding module 102 encodes or decodes the data of the first and third signals having the first form into a second signal having a second form. The second signal is outputted via the rear interface 17 on the back panel 16.

Figure 8B:
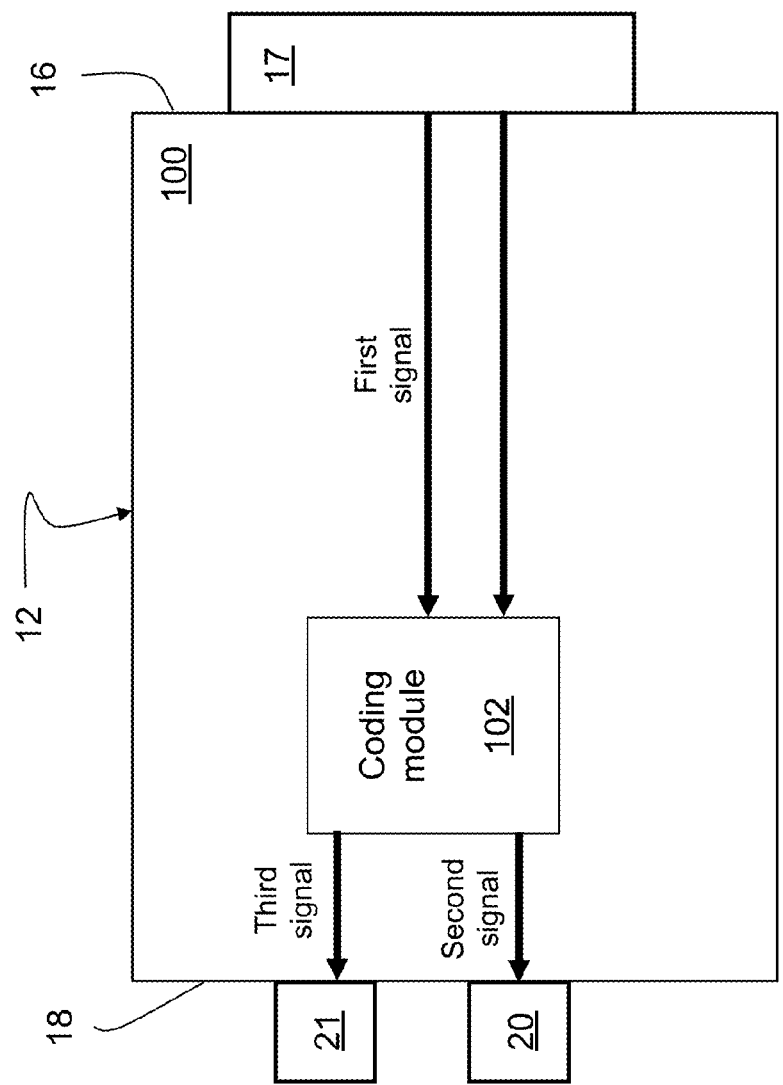
FIG. 8B is a simplified exemplary block diagram of an SFP unit having multiple signals encoding or decoding capabilities, according to another embodiment.

In still another particular aspect, and referring now to FIG. 8B, an exemplary block diagram of an SFP unit 100 comprising a coding module 102 for encoding or decoding a received signal into a plurality of signals outputted via a plurality of connectors is illustrated. The rear interface 17 on the back panel 16 receives a first signal comprising data in a first form. The coding module 102 encodes or decodes the data of the first signal having the first form into a second and a third signal having a second form. The connector 20 on the front panel 18 outputs the second signal and the connector 21 on the front panel 18 outputs the third signal.

Referring now concurrently to FIGS. 9A, 9B, 9C, 9D and 9E, an exemplary block diagram of an SFP unit 100 with a housing comprising a coding module 102 and at least one signal processing unit 104 or 105 is represented.

The signal processing unit 104 may process the data of a first signal before the coding module 102 encodes or decodes the first signal into the second signal. Alternatively or concurrently, the signal processing unit 105 processes the data of the second signal after the coding module 102 encoded or decoded the first signal into the second signal.

Figure 9A:
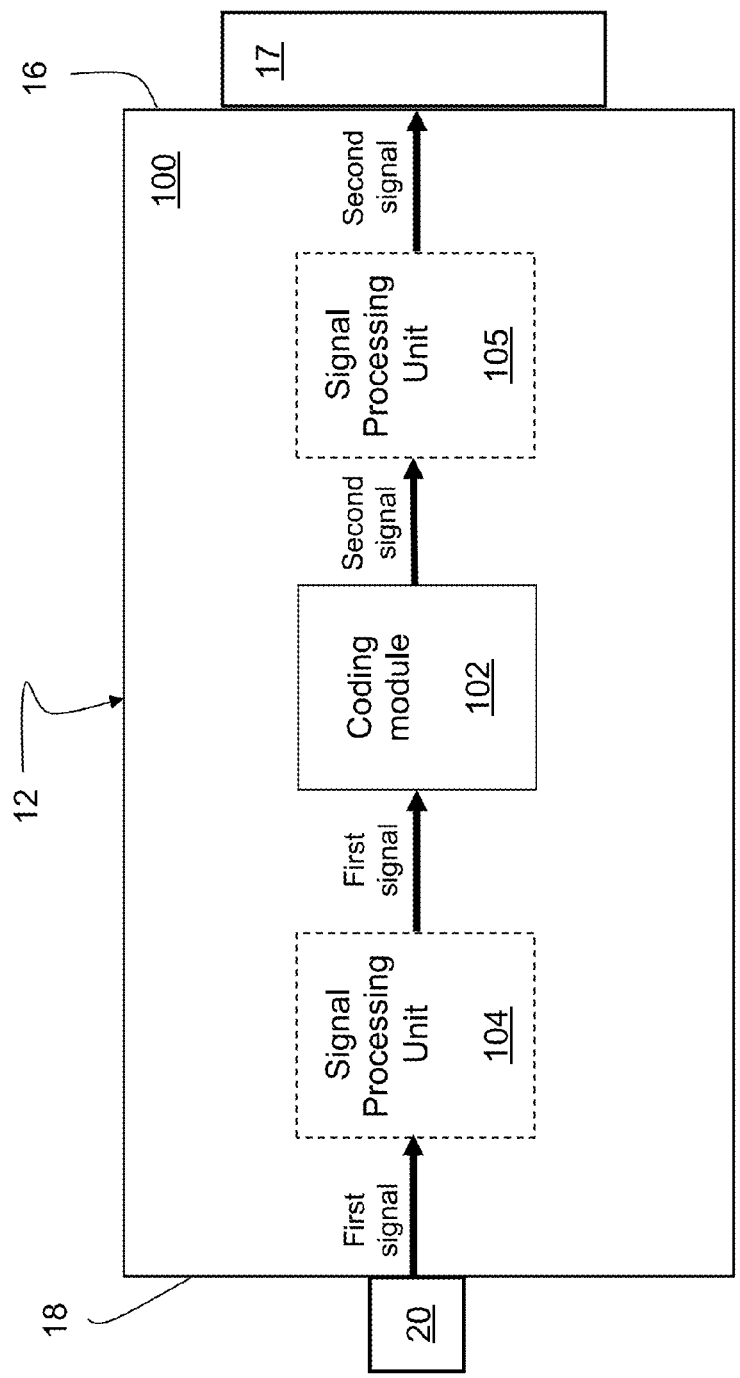
FIG. 9A is a simplified exemplary block diagram of an SFP unit having signal encoding or decoding capabilities along with signal processing capabilities, according to an embodiment.

In a first example illustrated in FIG. 9A, the connector 20 on the front panel 18 receives the first signal. Then, the data of the first signal may be processed by the signal processing unit 104 before being encoded or decoded by the coding module 102 into the second signal outputted by the rear interface 17 on the back panel 16. Alternatively, the coding module 102 directly encodes or decodes the data of the first signal into the second signal, which is processed by the signal processing unit 105 before being outputted by the rear interface 17 on the back panel 16.

Figure 9B:
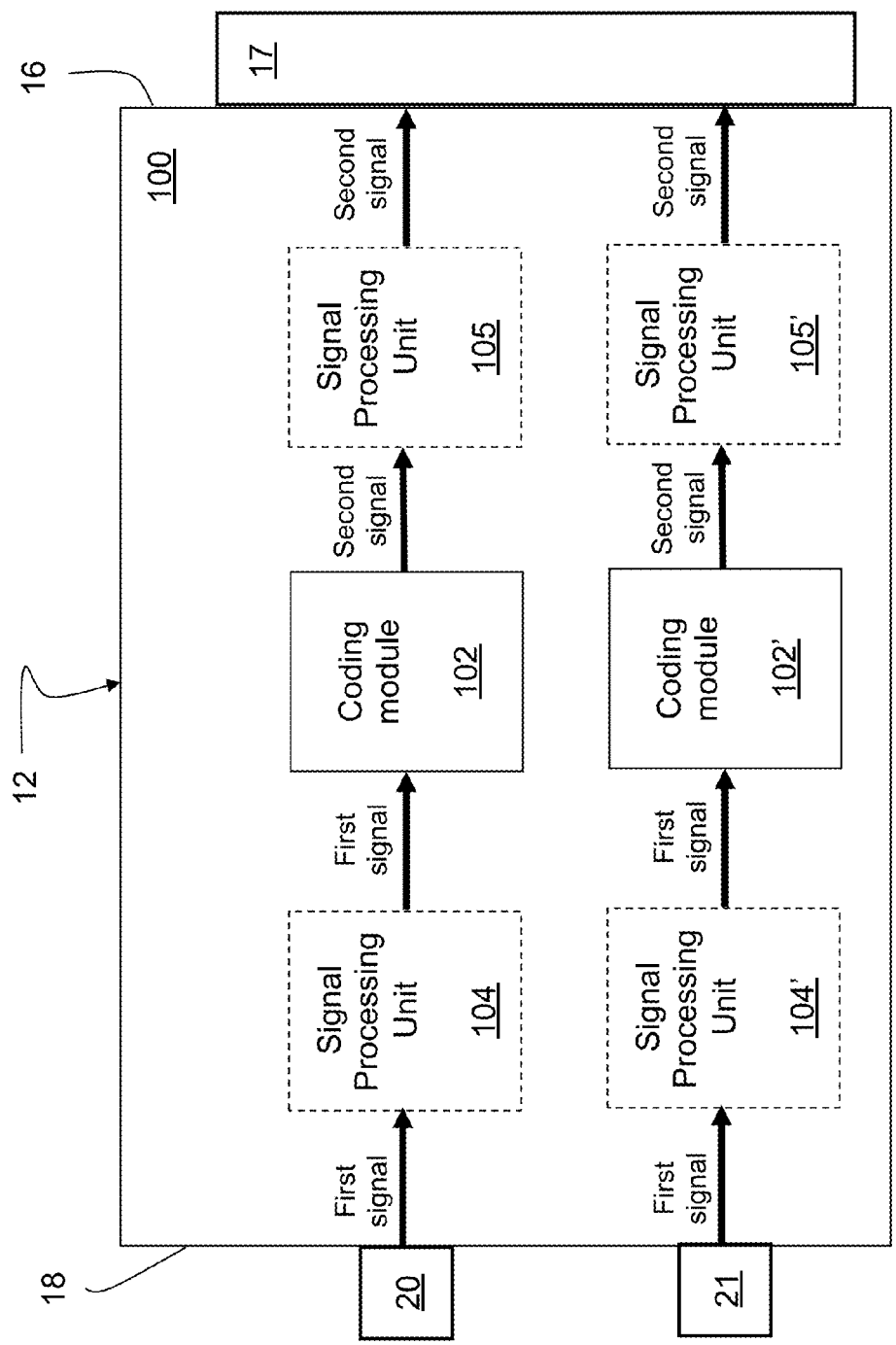
FIG. 9B is a simplified exemplary block diagram of the SFP unit of FIG. 9A with two coding modules, according to another embodiment.

In an alternative illustrated in FIG. 9B, the SFP unit 100 comprises a second coding module 102' for encoding or decoding another first signal received from the second connector 21 on the front panel 18, and outputting the resulting second signal via the rear interface 17 on the back panel 16. A signal processing unit 104' may process the data of the first signal before the coding module 102' encodes or decodes the first signal into the second signal. Alternatively, a signal processing unit 105' processes the data of the second signal after the coding module 102' encoded or decoded the first signal into the second signal.

Figure 9C:
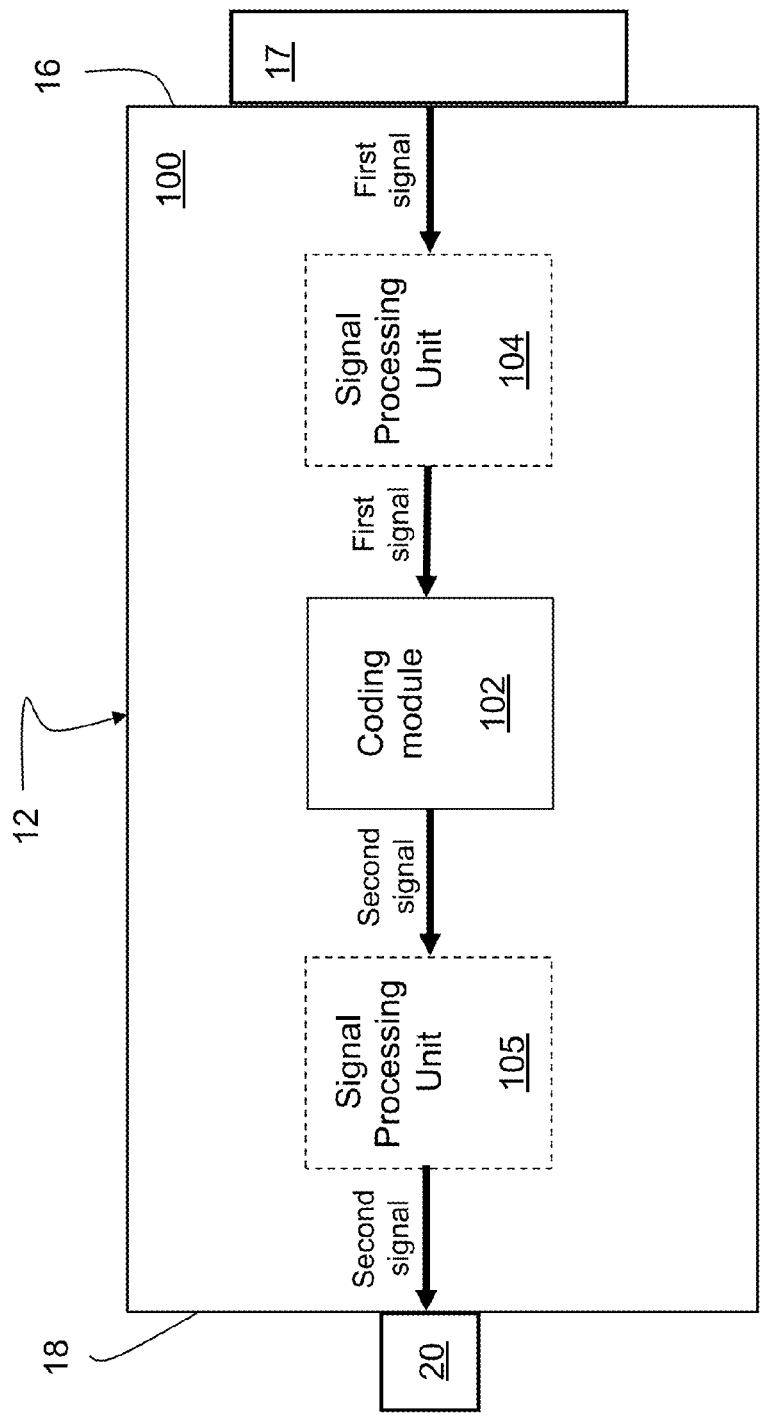
FIG. 9C is a simplified exemplary block diagram of an SFP unit having signal encoding or decoding capabilities along with signal processing capabilities, according to another embodiment.

In a second example illustrated in FIG. 9C, the rear interface 17 on the back panel 16 receives the first signal. Then, the data of the first signal may be processed by the signal processing unit 104 before being encoded or decoded by the coding module 102 into the second signal outputted by the connector 20 on the front panel 18. Alternatively, the coding module 102 directly encodes or decodes the data of the first signal into the second signal, which is processed by the signal processing unit 105 before being outputted by the connector 20 on the front panel 18.

Figure 9D:
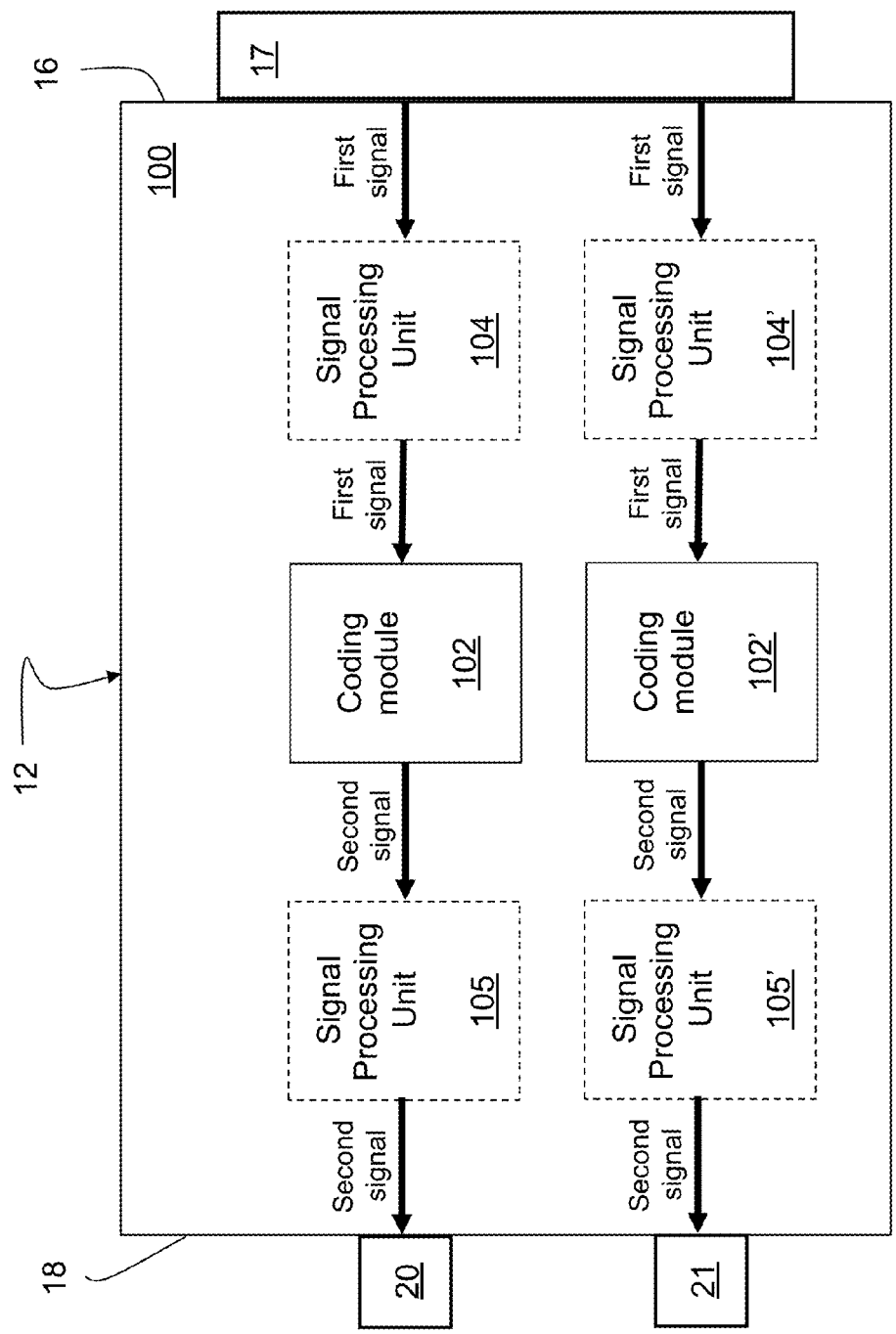
FIG. 9D is a simplified exemplary block diagram of the SFP unit of FIG. 9C with two coding modules, according to another embodiment.

In an alternative illustrated in FIG. 9D, the SFP unit 100 comprises a second coding module 102' for encoding or decoding another first signal received from the rear interface 17 on the back panel 16, and outputting the resulting second signal via the second connector 21 on the front panel 18. A signal processing unit 104' may process the data of the first signal before the coding module 102' encodes or decodes the first signal into the second signal. Alternatively, a signal processing unit 105' processes the data of the second signal after the coding module 102' encoded or decoded the first signal into the second signal.

Figure 9E:
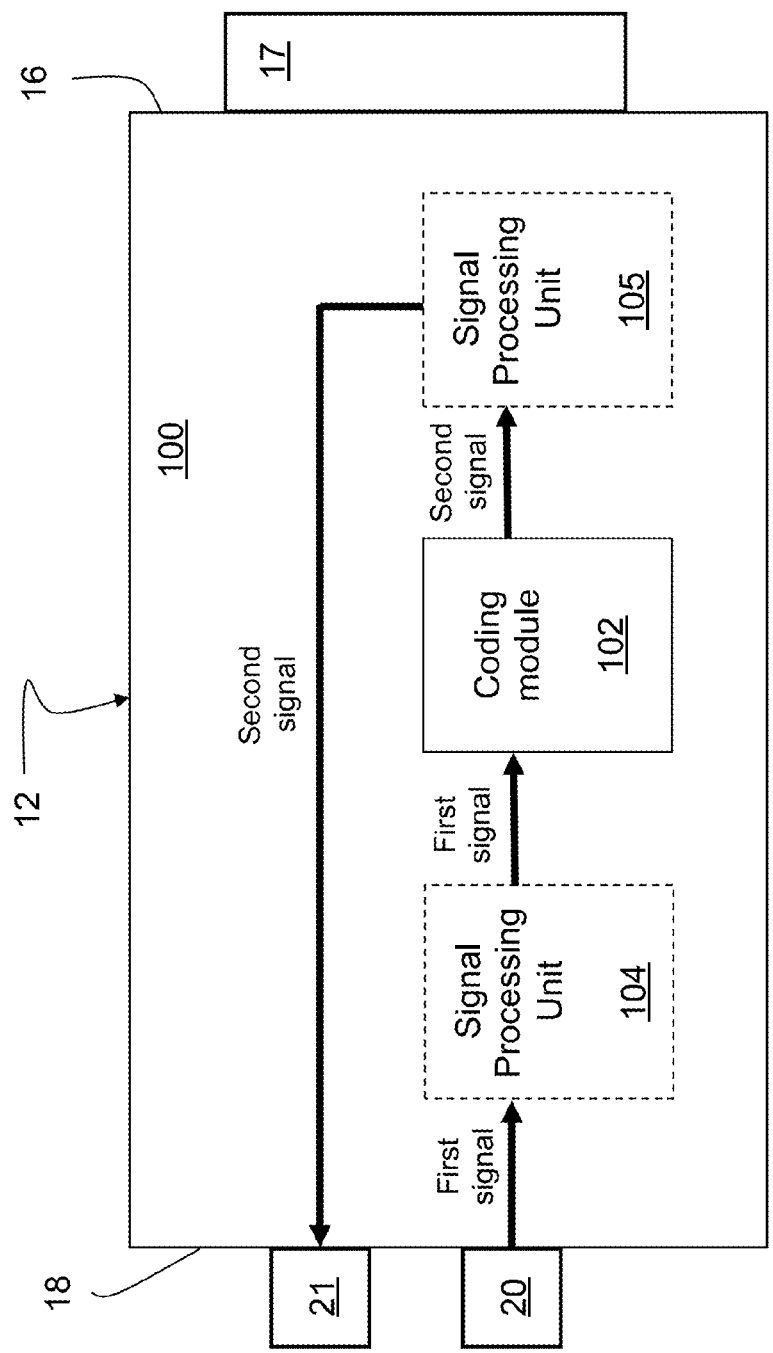
FIG. 9E is a simplified exemplary block diagram of an SFP unit having signal encoding or decoding capabilities along with signal processing capabilities, according to another embodiment.

In a third example illustrated in FIG. 9E, the connector 20 on the front panel 18 receives the first signal. Then, the data of the first signal may be processed by the signal processing unit 104 before being encoded or decoded by the coding module 102 into the second signal outputted by the connector 21 on the front panel 18. Alternatively, the coding module 102 directly encodes or decodes the data of the first signal into the second signal, which is processed by the signal processing unit 104' before being outputted by the connector 21 on the front panel 18.

Although not represented in FIGS. 9A-9E, the SFP unit 100 may comprise more than one signal processing unit 104 for processing the first signal, before encoding or decoding the first signal with the coding module 102. Similarly, the SFP unit 100 may comprise more than one signal processing unit 105 for processing the second signal which has been encoded or decoded with the coding module 102. Furthermore, the SFP unit 100 may comprise simultaneously at least one signal processing unit 104 for processing the first signal before encoding or decoding the first signal with the coding module 102, and at least one signal processing unit 105 for processing the second signal which has been encoded or decoded with the coding module 102.

Various types of signal processing units 104 or 105 may be used in the SFP unit 100, including for example a signal processing unit providing at least one of the following functionalities: signal re-clocking, signal reshaping or reconditioning, signals combination or separation, etc.

In a particular aspect, the housing of the SFP unit 100 further comprises at least one of the following: an analog to digital convertor (ADC) for transforming the first signal from an analog format to a digital format before encoding or decoding the data of the first signal with the coding module 102, a deserializer for transforming the first signal from a serial data format to a digital format before encoding or decoding the first signal with the coding module 102, a digital to analog convertor (DAC) for transforming the second signal from a digital format to an analog format before outputting the second signal, and a serializer for transforming the second signal from a digital format to a serial data format before outputting the second signal.

Figure 10:
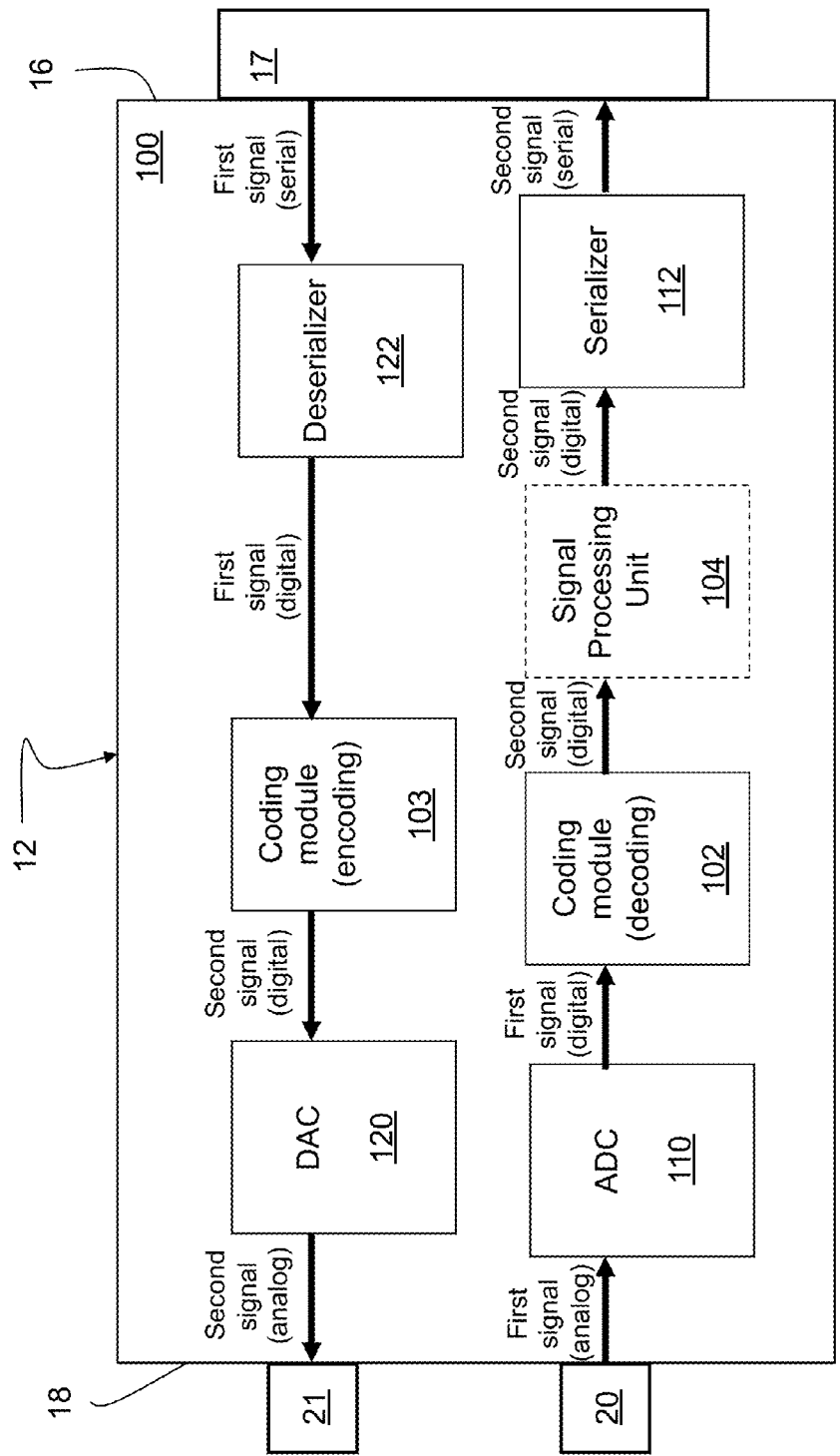
FIG. 10 is a simplified exemplary block diagram of an SFP unit having signal encoding or decoding capabilities along with signal processing capabilities, according to an embodiment.

Referring now to FIG. 10, an exemplary block diagram of an SFP unit 100 comprising two coding modules 102 and 103, an ADC 110, a signal processing unit 104, a serializer 112, a deserializer 122 and a DAC 120 is represented.

The connector 20 on the front panel 18 receives a first signal in an analog format. The ADC 110 transforms the first signal from the analog format to a digital format. The coding module 102 decodes the first signal into a second signal. The second signal is then processed by the signal processing unit 104 before the serializer 112 transforming the second signal from the digital format to a serial data format. Lastly, the rear interface 17 on the back panel 16 outputs the second signal.

In the opposite direction, the rear interface 17 on the back panel 16 receives a first signal in a serial data format. Then, the deserializer 122 transforms the first signal from the serial data format to a digital format. The coding module 103 encodes the first signal into the second signal. Then, the DAC 120 transforms the second signal from the digital format to an analog format. Lastly, the connector 21 on the front panel 18 outputs the second signal.

FIG. 10 is another illustration of an SFP unit 100 having more than one coding module, each coding module implementing either a signal decoding functionality (e.g. 102) or a signal encoding functionality (e.g. 103). Furthermore, a single coding module of the SFP unit 100 (not illustrated in FIG. 10) may implement simultaneously an encoding functionality and a complementary decoding functionality. Such a dual mode coding module is capable of encoding the data of a first signal having a first form into a second signal having a second form, and decoding the data of a third signal having the second form into a fourth signal having the first form.

Figure 11A:
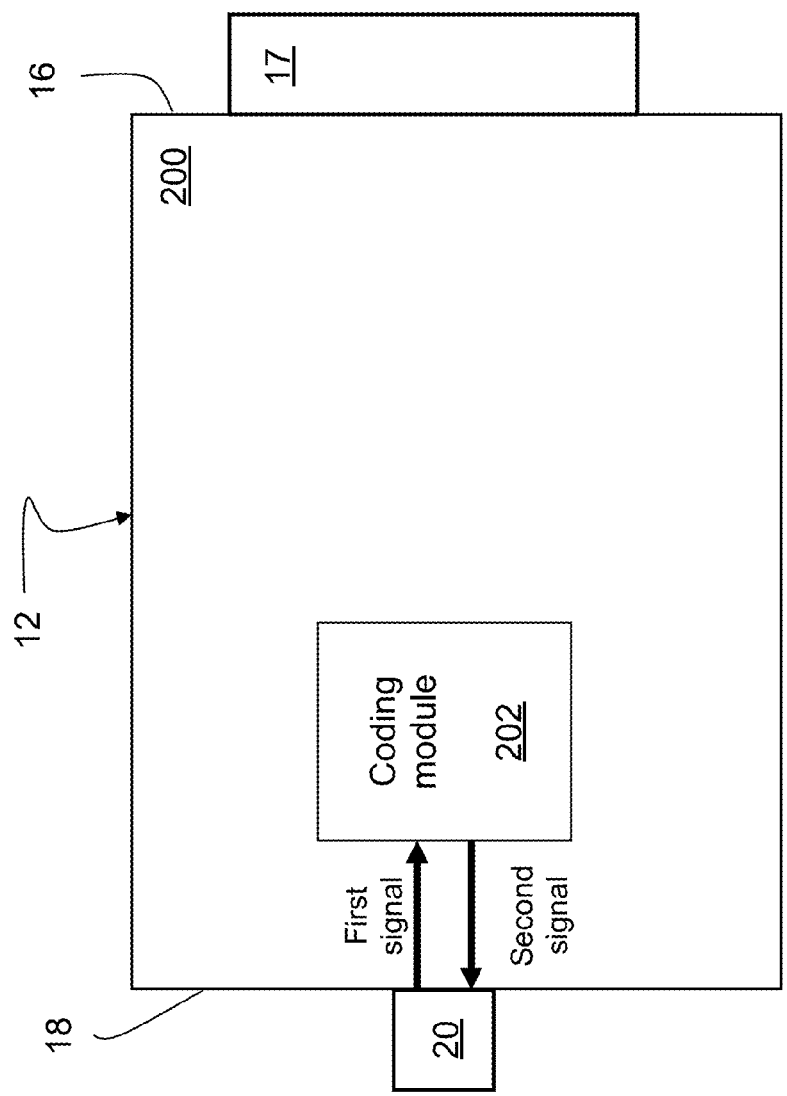
FIG. 11A is a simplified exemplary block diagram of an SFP transceiver unit having signal encoding or decoding capabilities, according to an embodiment.
Figure 11B:
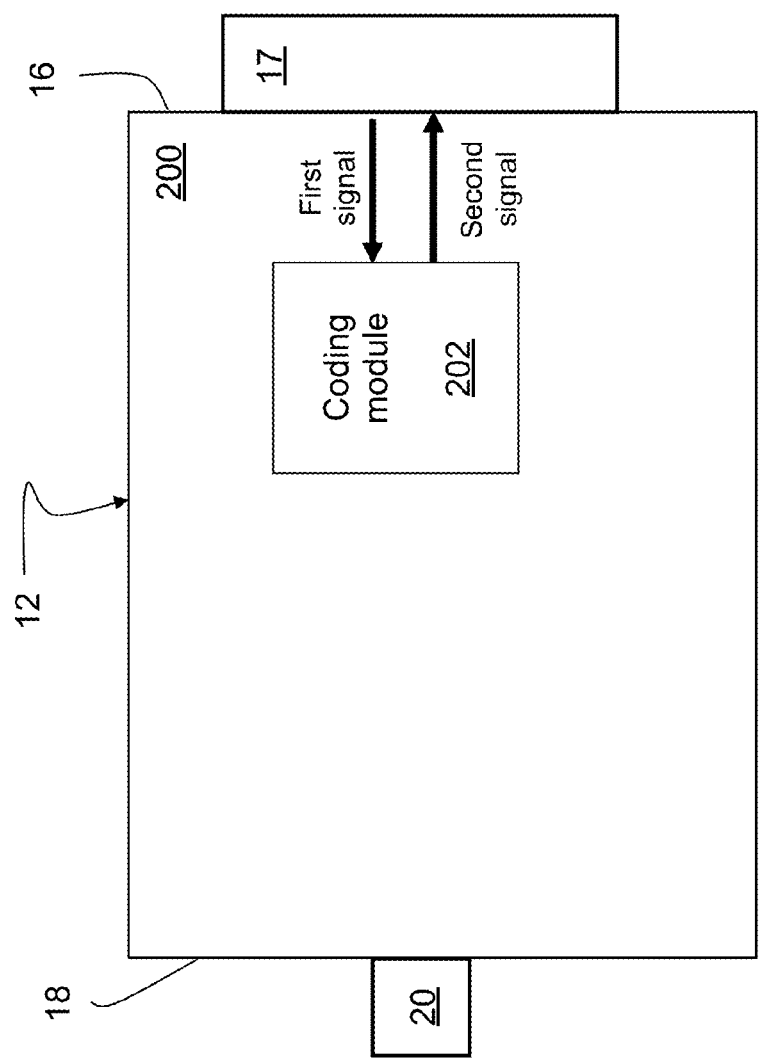
FIG. 11B is a simplified exemplary block diagram of an SFP transceiver unit having signal encoding or decoding capabilities, according to another embodiment.

Referring now concurrently to FIGS. 11A and 11B, an SFP transceiver unit 200 having signal encoding or decoding capabilities is illustrated. As mentioned previously, the SFP unit 200 has a housing 12 having specific standardized dimensions and is adapted to being inserted into a chassis of a hosting unit.

FIG. 11A represents the SFP unit 200 having a transceiver connector 20 on a front panel 18 of the housing 12 for receiving a first signal comprising data in a first form. A coding module 202 encodes or decodes the data of the first signal into a second signal having a second form. The second signal is outputted by the same transceiver connector 20.

FIG. 11B represents an alternative where the SFP unit has a transceiver rear interface 17 on a back panel 16 of the housing 12 for receiving the first signal comprising data in the first form. The coding module 202 encodes or decodes the data of the first signal into the second signal having the second form. The second signal is outputted by the same transceiver rear interface 17.

Additional features of an SFP unit having encoding or decoding capabilities, which have been previously described with respect to FIGS. 7A-E, 8A-B, 9A-E and 10, can be applied to the SFP transceiver unit 200 represented in FIGS. 11A and 11B.

In a particular aspect, encoding the first signal by the coding module 202 comprises compressing the data of the first signal. Alternatively, decoding the first signal by the coding module 202 comprises decompressing the data of the first signal. The coding module 202 may also have transcoding capabilities. The coding module 202 may further be capable of performing data encryption or decryption.

In another particular aspect, the first and second signals are video signals. In a particular embodiment, the second form is compatible with one of the following video standards: the JPEG standard, the JPEG 2000 standard, the H264 standard, the HEVC standard, the MPEG2 standard, the MPEG4 standard, etc. The first video signal (e.g. an HDTV signal) received by the SFP unit 200 is encoded by the coding module 202 into the second video signal having the second form (e.g. a JPEG 2000 signal). In an alternative embodiment, the first form is compatible with one of the following video standards: the JPEG standard, the JPEG 2000 standard, the H264 standard, the HEVC standard, the MPEG2 standard, the MPEG4 standard, etc. The first video signal having the first form (e.g. a JPEG 2000 signal) received by the SFP unit 200 is decoded by the coding module 202 into the second video signal (e.g. an HDTV signal).

In still another particular aspect, the coding module 202 encodes or decodes a plurality of signals received via a plurality of transceiver connectors. For instance, referring to FIG. 11A, the SFP unit 200 may comprise a second transceiver connector 21 (not represented on FIG. 11A) on the front panel 18 for receiving a third signal comprising data in the first form. The coding module 202 encodes or decodes the data of the third signal having the first form into a fourth signal having the second form. The second signal is outputted by the same transceiver connector 21.

In yet another aspect, the housing 12 of the SFP transceiver unit 200 comprises at least one signal processing unit (not represented in FIGS. 11A and 11B). The signal processing unit may process the data of the received first signal before the coding module 202 encodes or decodes the first signal into the second signal. Alternatively, the signal processing unit processes the data of the second signal after the coding module 202 encoded or decoded the received first signal into the second signal. The processing unit may also process the data of both the first received signal and the second outputted signal.

In another particular aspect, the housing 12 of the SFP transceiver unit 200 further comprises at least one of the following (not represented in FIGS. 11A and 11B): an ADC for transforming the first signal from an analog format to a digital format before encoding or decoding the data of the first signal with the coding module 202, a deserializer for transforming the first signal from a serial data format to a digital format before encoding or decoding the first signal with the coding module 202, a DAC for transforming the second signal from a digital format to an analog format before outputting the second signal, and a serializer for transforming the second signal from a digital format to a serial data format before outputting the second signal.

Figure 12A:
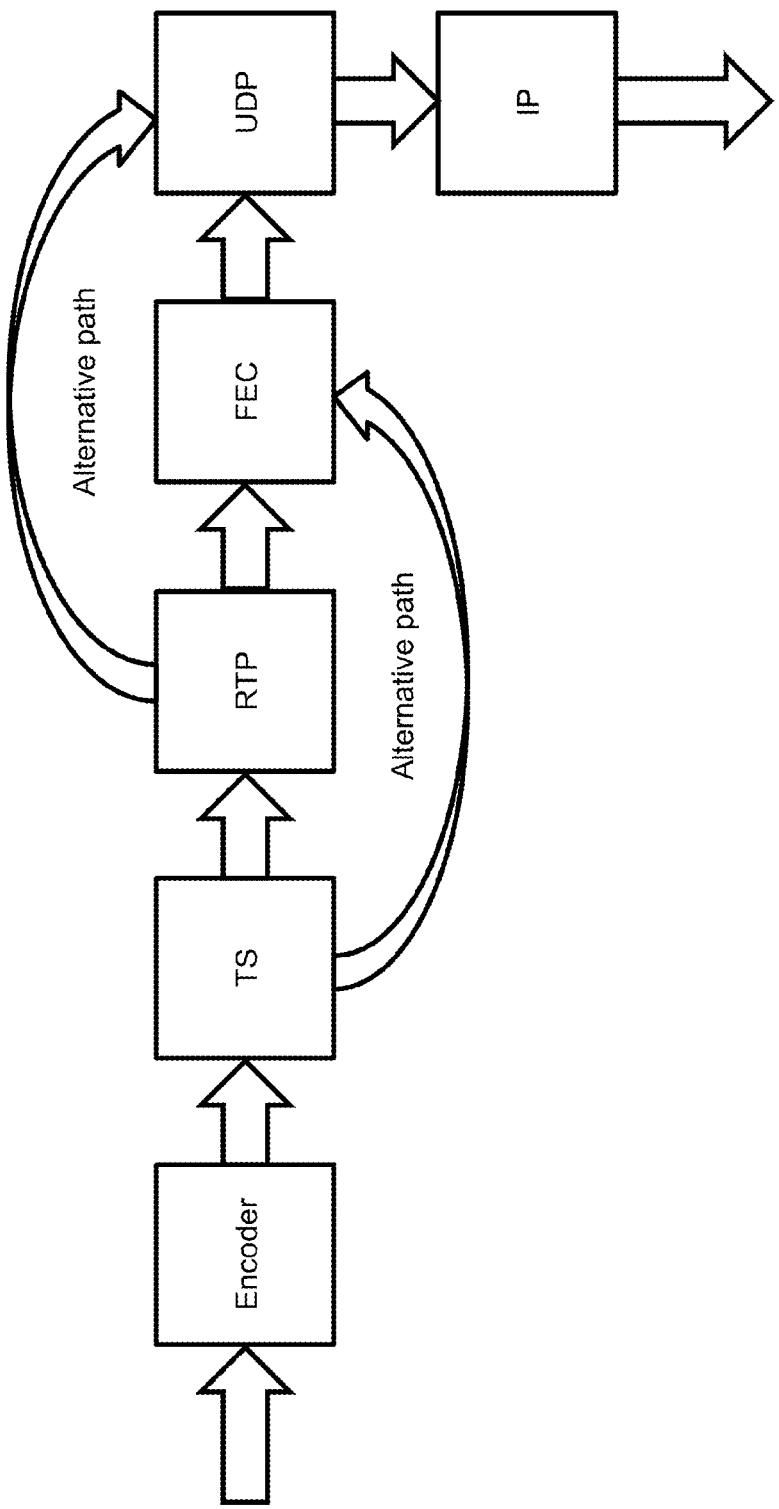
FIG. 12A is an exemplary flow diagram of operations performed by a coding module for encoding data to be further transported via the Internet Protocol.

Referring now to FIG. 12A, an exemplary flow diagram of operations performed by the coding module 102 for encoding data from a first form to a second form is represented. For illustration purposes, the data in the second form are transported via the Internet Protocol (IP) and thus need additional processing by the coding module.

The data in the first form are first encoded in the second form by an encoder of the coding module 102. A transport stream (TS) is then built around the encoded data to form packets for transporting the encoded data. An optional Real Time Protocol/Real Time Control Protocol (RTP/RTCP) layer is added to the Transport Stream. An optional Forward Error Correction (FEC) algorithm is applied to the packets. Finally, User Datagram Protocol (UDP) IP layers are added. The IP packets are further outputted through a connector of a transceiving unit comprising the coding module, and transported over a physical layer such as Ethernet, Fibre-Channel, or any other protocol capable of transporting IP traffic. This flow diagram corresponds for example to the SFP unit 100 represented in FIG. 7C, where data are received via the rear interface 17 on the back panel 16, processed by the coding module 102, and the resulting IP packets comprising encoded data outputted via the connector 20 on the front panel 18.

Figure 12B:
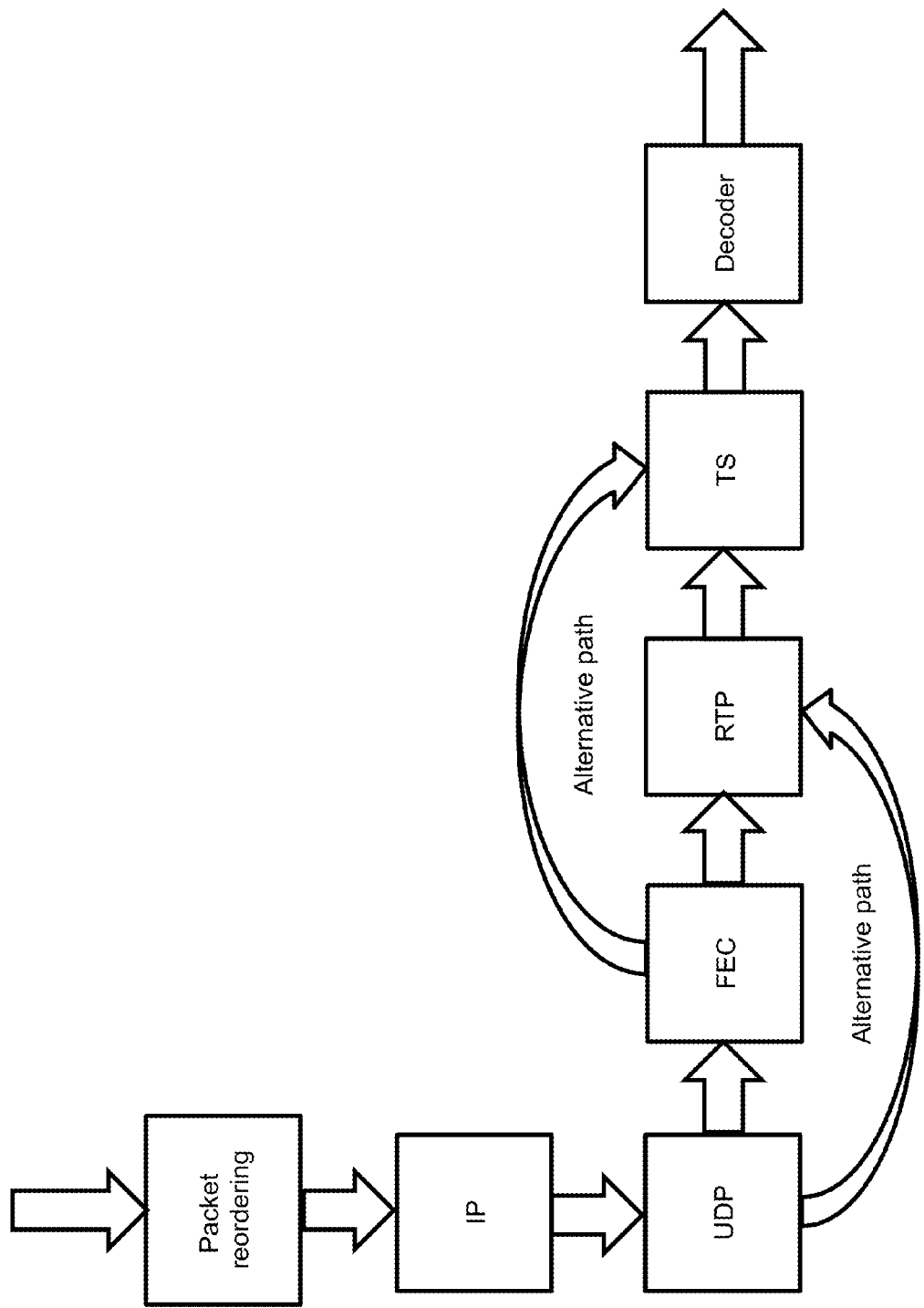
FIG. 12B is an exemplary flow diagram of operations performed by a coding module for decoding data transported via the Internet Protocol.

Referring now to FIG. 12B, an exemplary flow diagram of operations performed by the coding module 102 for decoding data from a first form to a second form is represented. For illustration purposes, the data in the first form are transported via the Internet Protocol (IP) and thus need additional processing by the coding module 102.

IP packets comprising data encoded in the first form are transported over a physical layer such as Ethernet, Fibre-Channel, or any other protocol capable of transporting IP traffic. The incoming IP packets are first reordered since packet ordering is not guaranteed by the IP protocol. The packets are then stripped from their IP and UDP layers. Then, Forward Error Correction (FEC) is performed to recover traffic errors (this step is optional: the packets may not support FEC). The packets are then stripped from their RTP/RTCP layer (this step is optional: the packets may not include an RTP/RTCP layer). The resulting Transport Streams (TS) are stripped of their protocol layer, filtered, and sent to a decoder of the coding module. The data in the first form are decoded in the second form by the decoder. The decoded data are further outputted through a connector of a transceiving unit comprising the coding module 102, as shown in the previous examples. This flow diagram corresponds for example to the SFP unit 100 represented in FIG. 7B, where IP packets comprising encoded data are received via the connector 20 on the front panel 18, processed by the coding module 102, and the resulting decoded data outputted via the rear interface 17 on the back panel 16.

Figure 12C:
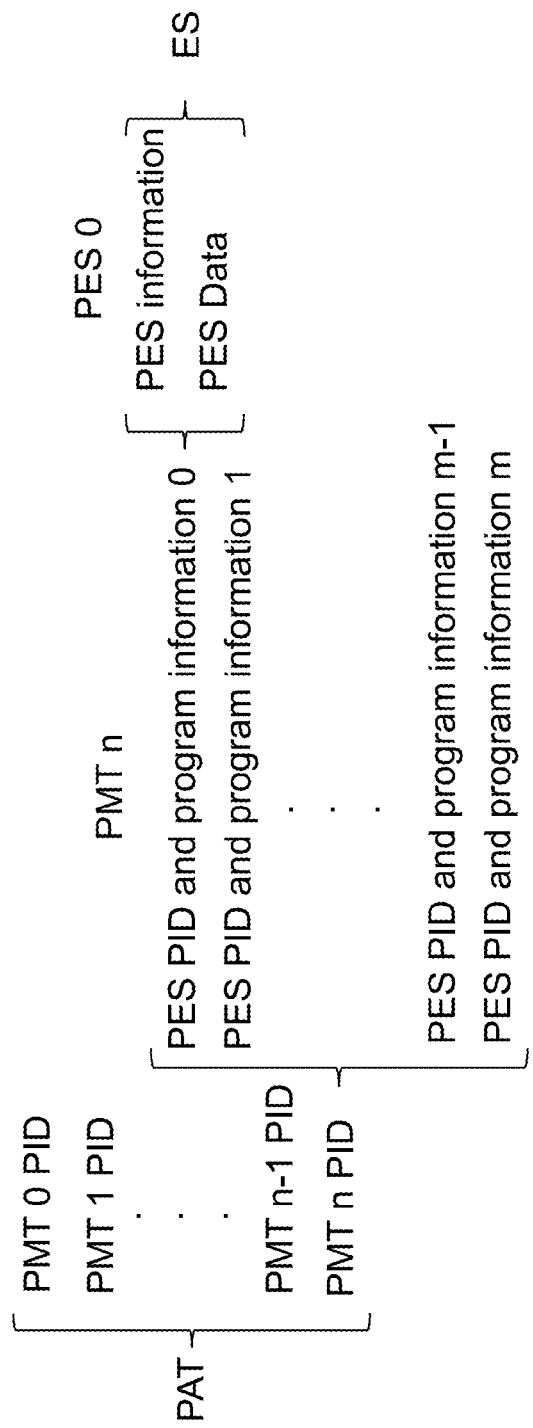
FIG. 12C is an exemplary data structure for managing the Transport Streams (TS) illustrated in FIGS. 12A and 12B.

Referring now concurrently to FIGS. 12A, 12B and 12C, an exemplary data structure is represented in FIG. 12C for managing the Transport Streams (TS) illustrated in FIGS. 12A and 12B, in the context of the encoding or decoding of data related to a plurality of programs comprising video and corresponding audio data.

A Transport Stream (TS) contains a Program Associate Table (PAT), a Program Map Table (PMT), a Packetized Elementary Stream (PES) and data. The stream can contain multiple programs, which are listed in the PAT. Each entry in the PAT has an associated PMT. Each PMT contains information on one or multiple programs. The programs have an associated number and PES Program Identifier (PID). The PES contains information on the audio data, video data or data stream. Each PES header marks the start of an Elementary Stream (ES) and subsequent ES data is found following the occurrence of the PES header. The encoded or decoded data consist in the ES data.

Figure 12D:
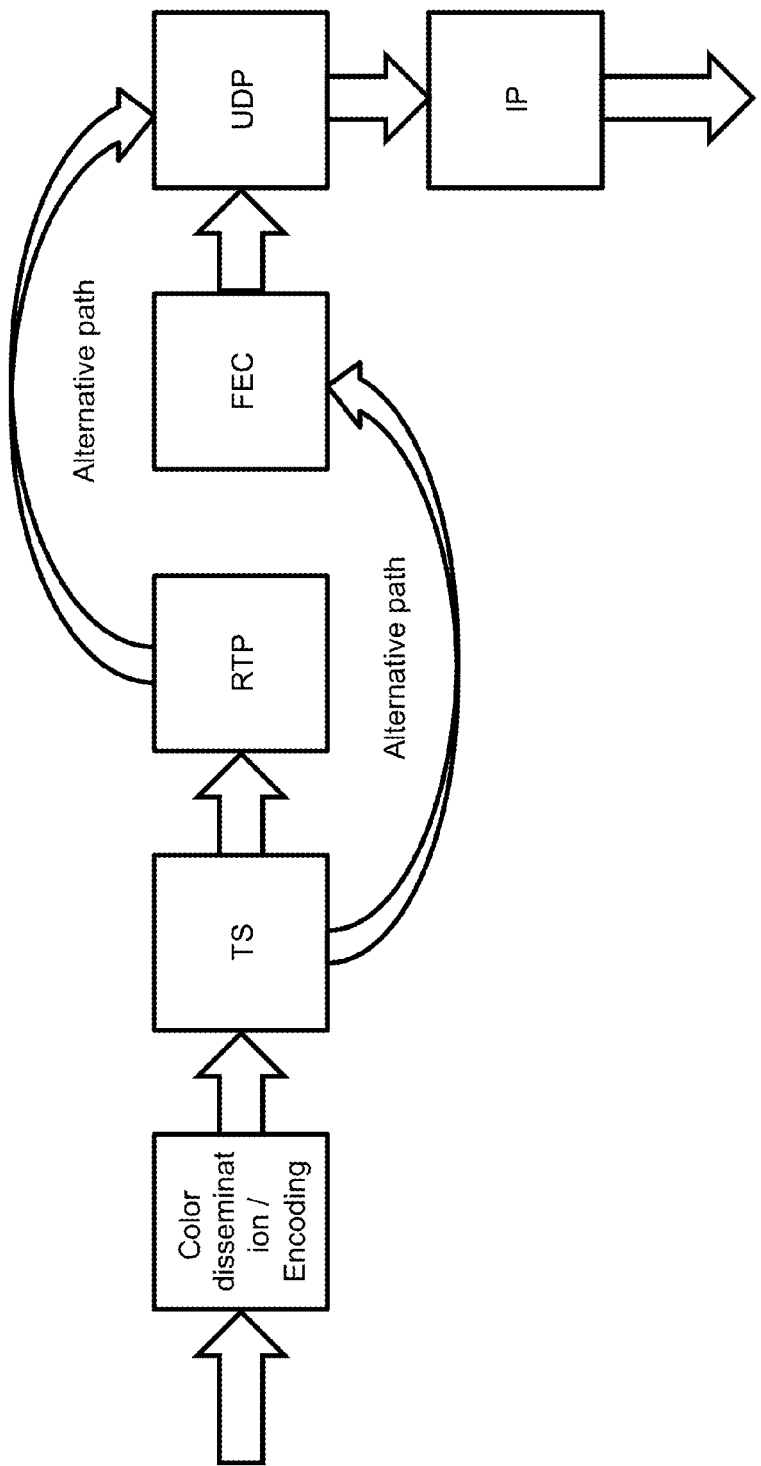
FIG. 12D is an exemplary data structure for performing color dissemination.

Reference is now made to FIG. 12D which represents an exemplary flow diagram of operations performed by the coding module 102 which is similar to the flow diagram of operations of FIG. 12A, but further includes or alternatively consists of performing color dissemination. Video signals contain color information on a per pixel basis. The volume of color information quickly adds up in high-resolution frames, and often results in very high bit rates. Although commercial video broadcasting are adapted for transporting such high volume of color information, a serious challenge is encountered when the high-resolution video is to be transported over an Internet Protocol.

To overcome this problem, the present coding module 102 performs color dissemination. All frames of video include a certain number of pixels (for example 1920×1080 pixels). Each pixel further has its own color information, typically encoded in a 10-bit format. Color dissemination is based on the principle of color variance. As the human eye is susceptible to color variances, different color information schemes are used to reduce the total amount of data that is to be transported. Examples of color information schemes include the 4:4:4 pixels, the 4:2:2 pixels, the 4:2:0 pixels and the 4:1:1 pixels.

Each of these color information schemes are based on a four-pixel sampling pattern (i.e. a color scheme pattern repeats every four pixels through a frame). The first number in the color information scheme, i.e. the first digit corresponds respectively to the green (luminance):red (chrominance):blue (chrominance).

The 4:4:4 color information scheme indicates that the green:red:blue colors are sampled in all four consecutive pixels. This is the color information scheme in which no coding is performed.

The 4:2:2 color information scheme indicates that the green information is provided for each pixel, while the red and blue information is provided for only two pixels of every group of four pixels. In a first embodiment of color dissemination, the present coding module 102 receives an input signal with a 4:4:4 color information, and codes it into a 4:2:2 color information by discarding the red and blue color information of two pixels of every four consecutive horizontal pixels, so as to reduce the required data rate to transport the frames over IP.

The 4:2:0 color information scheme reduces the color information in two dimensions of a frame concurrently, i.e. on consecutive pixels along a line (horizontally), and on consecutive pixels along a row (vertically). In the 4:2:0 color information scheme, all pixels retain their green color value. However, the red color value is retained for two pixels out of four on a per line and per row basis. The blue color value is also retained for two pixels out of four on a per line and per row basis, but for different lines and rows than the red color information. In another embodiment, the present coding module 102 receives an input signal with a 4:4:4 or a 4:2:2 color scheme, and discards the red and blue color information of all pixels so as to generate an output with a color information scheme corresponding to the 4:2:0 color information scheme.

The 4:1:1 color information scheme retains the color information provided for each first pixel of a group of four consecutive horizontal pixels, while discarding the red and blue information of every subsequent three pixels. In yet another embodiment, the present coding module 102 receives an input signal with either a 4:4:4, 4:2:2 or 4:2:0 color information scheme, and modifies the color information scheme of the frames to correspond to the 4:1:1 color information scheme.

In a particular embodiment, the plurality of programs comprising encoded video and corresponding audio data are received via a single channel of a SDI connector on a front panel of a transceiving unit, the decoding of the video and audio data for the plurality of programs being performed by a coding module of the transceiving unit. Alternatively, the plurality of programs comprising encoded video and corresponding audio data are transmitted via a single channel of a SDI connector on a front panel of a transceiving unit, the encoding of the video and audio data for the plurality of programs being performed by a coding module of the transceiving unit.

Although the coding modules of the present disclosure have been described with encoding or decoding capabilities of various types of video signals (optionally in combination with corresponding audio signals), the coding modules may also encode or decode other types of signals, such as for example telecommunication signals.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
   a housing having specific standardized dimensions and adapted to being inserted into a chassis of a hosting unit;
   a first connector for receiving a first signal comprising data in a first form;
   a coding module in the housing for encoding or decoding the data of the first signal into a second signal having a second form;
   a second connector for outputting the second signal; and
   a third connector for performing one of the following: receiving a third signal comprising data in the first form, the coding module further encoding or decoding the data of the third signal having the first form into the second signal having the second form; or outputting a third signal having the second form, the coding module further encoding or decoding the data of the first signal having the first form into the third signal having the second form.

2. The standardized hot-pluggable transceiving unit of claim 1, wherein encoding the first signal comprises compressing the data of the first signal.

3. The standardized hot-pluggable transceiving unit of claim 1, wherein decoding the first signal comprises decompressing the data of the first signal.

4. The standardized hot-pluggable transceiving unit of claim 1, wherein the coding module further comprises at least one of the following capabilities: data transcoding, data encryption and data decryption.

5. The standardized hot-pluggable transceiving unit of claim 1, wherein the first and second signals are video signals.

6. The standardized hot-pluggable transceiving unit of claim 5, wherein the second form is compatible with one of the following standards: the JPEG standard, the JPEG 2000 standard, the H264 standard, the HEVC standard, the MPEG2 standard, and the MPEG4 standard; and the coding module encodes the data of the first signal into the second signal having the second form.

7. The standardized hot-pluggable transceiving unit of claim 5, wherein the first form is compatible with one of the following standards: the JPEG standard, the JPEG 2000 standard, the H264 standard, the HEVC standard, the MPEG2 standard, and the MPEG4 standard; and the coding module decodes the data of the first signal into the second signal having the second form.

8. The standardized hot-pluggable transceiving unit of claim 1, wherein the first and second signals correspond to a plurality of programs comprising audio and video data.

9. The standardized hot-pluggable transceiving unit of claim 1, wherein the housing further comprises at least one signal processing unit for performing one of the following: processing the data of the first signal with the signal processing unit before encoding or decoding the first signal with the coding module or processing the second signal with the signal processing unit before outputting the second signal.

10. A standardized hot-pluggable transceiving unit comprising:
   a housing having specific standardized dimensions and adapted to being inserted into a chassis of a hosting unit;
   a connector for receiving a first signal comprising data in a first form; and
   a coding module in the housing for encoding or decoding the data of the first signal into a second signal having a second form, the second signal having the second form being outputted by the connector which received the first signal comprising the data in the first form.

11. The standardized hot-pluggable transceiving unit of claim 10, wherein encoding the first signal comprises compressing the first signal.

12. The standardized hot-pluggable transceiving unit of claim 10, wherein decoding the first signal comprises decompressing the first signal.

13. The standardized hot-pluggable transceiving unit of claim 10, wherein the coding module further comprises at least one of the following capabilities: data transcoding, data encryption, data decryption and color dissemination.

14. The standardized hot-pluggable transceiving unit of claim 10, wherein the first and second signals are video signals, and one of the first form or second form is compatible with one of the following standards: the JPEG standard, the JPEG 2000 standard, the H264 standard, the HEVC standard, the MPEG2 standard, and the MPEG4 standard.

15. A standardized hot-pluggable transceiving unit comprising:
   a housing having specific standardized dimensions and adapted to being inserted into a chassis of a hosting unit;
   a first connector for receiving a first signal comprising data in a first form;
   a coding module in the housing for compressing or decompressing the data of the first signal into a second signal having a second form; and
   a second connector for outputting the second signal.

16. The standardized hot-pluggable transceiving unit of claim 15, wherein the coding module further comprises at least one of the following capabilities: data transcoding, data encryption and data decryption.

17. The standardized hot-pluggable transceiving unit of claim 15, wherein the first and second signals are video signals.

18. The standardized hot-pluggable transceiving unit of claim 17, wherein the second form is compatible with one of the following standards: the JPEG standard, the JPEG 2000 standard, the H264 standard, the HEVC standard, the MPEG2 standard, and the MPEG4 standard; and the coding module encodes the data of the first signal into the second signal having the second form.

19. The standardized hot-pluggable transceiving unit of claim 17, wherein the first form is compatible with one of the following standards: the JPEG standard, the JPEG 2000 standard, the H264 standard, the HEVC standard, the MPEG2 standard, and the MPEG4 standard; and the coding module decodes the data of the first signal into the second signal having the second form.

20. The standardized hot-pluggable transceiving unit of claim 15, wherein the first and second signals correspond to a plurality of programs comprising audio and video data.

* * * * *